US012728387B2

(12) United States Patent
AlQahtani et al.

(10) Patent No.: US 12,728,387 B2
(45) Date of Patent: Sep. 8, 2026

(54) PLASMA TREATMENT IN SULFUR RECOVERY

(71) Applicant: Saudi Arabian Oil Company, Dhahran (SA)

(72) Inventors: Mohammad Saad AlQahtani, Dhahran (SA); Seung-Hak Choi, Dhahran (SA); Sebastien A. Duval, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 929 days.

(21) Appl. No.: 17/958,950

(22) Filed: Oct. 3, 2022

(65) Prior Publication Data

US 2024/0109034 A1 Apr. 4, 2024

(51) Int. Cl.
*B01D 53/86* (2006.01)

(52) U.S. Cl.
CPC ..... *B01D 53/8615* (2013.01); *B01D 53/8618* (2013.01); *B01D 2256/16* (2013.01); *B01D 2257/302* (2013.01); *B01D 2257/304* (2013.01); *B01D 2257/504* (2013.01)

(58) Field of Classification Search
None
See application file for complete search history.

(56) References Cited

U.S. PATENT DOCUMENTS

| | | | |
|---|---|---|---|
| 4,632,818 | A | 12/1986 | Chen et al. |
| 6,451,252 | B1 | 9/2002 | Ruan et al. |
| 7,901,578 | B2 | 3/2011 | Pruet |
| 7,994,374 | B2 | 8/2011 | Talley et al. |
| 8,702,994 | B2 | 4/2014 | Frost et al. |
| 8,728,325 | B2 | 5/2014 | Hussain et al. |
| 8,980,798 | B2 | 3/2015 | Tian et al. |
| 8,992,780 | B2 | 3/2015 | Champion et al. |
| 9,637,404 | B2 | 5/2017 | Minnich et al. |
| 10,106,411 | B2 | 10/2018 | Ballaguet et al. |
| 10,384,967 | B2 | 8/2019 | Hancock et al. |
| 10,392,271 | B2 | 8/2019 | Janson et al. |
| 11,000,778 | B2 | 5/2021 | Rithauddeen et al. |
| 11,040,904 | B2 | 6/2021 | Herron et al. |
| 11,691,119 | B2 | 7/2023 | Zhang et al. |
| 2005/0191237 | A1* | 9/2005 | Selinger .............. C01B 17/0495 422/186 |
| 2010/0224561 | A1 | 9/2010 | Marcin |
| 2010/0300872 | A1 | 12/2010 | Gutsol et al. |
| 2013/0168315 | A1 | 7/2013 | Matar et al. |
| 2017/0173527 | A1* | 6/2017 | O'Connell .......... C01B 17/0447 |
| 2018/0370834 | A1 | 12/2018 | Sutton-Sharp |
| 2019/0118114 | A1 | 4/2019 | Rithauddeen et al. |
| 2020/0398245 | A1 | 12/2020 | Zhang et al. |
| 2023/0183588 | A1 | 6/2023 | Al-Qahtani et al. |
| 2024/0109776 | A1 | 4/2024 | AlQahtani et al. |
| 2024/0150203 | A1 | 5/2024 | AlQahtani et al. |

FOREIGN PATENT DOCUMENTS

| | | | | |
|---|---|---|---|---|
| CA | 1168024 | A * | 5/1984 | ......... C01B 17/0456 |
| CA | 2764156 | | 12/2010 | |
| CA | 2921749 | | 8/2017 | |
| CN | 1386563 | | 12/2002 | |
| CN | 103043840 | | 4/2013 | |
| CN | 106277531 | | 1/2017 | |
| CN | 108970349 | A | 12/2018 | |
| CN | 110127623 | | 8/2019 | |
| CN | 210528467 | * | 5/2020 | |
| EP | 2770041 | | 8/2014 | |
| KR | 101189834 | | 9/2012 | |
| KR | 102202958 | | 1/2021 | |
| RU | 2772765 | * | 10/2018 | |
| WO | WO 2013093789 | | 6/2013 | |
| WO | WO 2013121217 | | 8/2013 | |

OTHER PUBLICATIONS

SAIP Examination Report in Saudi Arabian Appln. No. 123450490, dated Nov. 10, 2024, 16 pages (with English Translation).

Borraccia et al., "Oxygen enrichment in Sulphur plants to reduce the life cycle costs of new-build, large gas plants," Abu Dhabi International Petroleum Exhibition & Conference, Nov. 2016, 15 pages.

(Continued)

*Primary Examiner* — Sheng H Davis
(74) *Attorney, Agent, or Firm* — Dinsmore & Shohl LLP

(57) ABSTRACT

A system and method for removing sulfur compounds from gas, including providing a feed gas having sulfur compounds including hydrogen sulfide ($H_2S$) to a sulfur recovery unit (SRU) that has a furnace or a non-thermal plasma (NTP) reactor, discharging an SRU tail gas having $H_2S$ from the SRU to a tail gas treatment (TGT) unit having a hydrogenation reactor, a quench tower, and a TGT NTP reactor, converting sulfur compounds in the SRU tail gas in the hydrogenation reactor into $H_2S$, discharging a process gas having $H_2S$ from the hydrogenation reactor to the quench tower and removing water vapor from the process gas in the quench tower, discharging an overhead gas having $H_2S$ from the quench tower to the TGT NTP reactor, and converting $H_2S$ in the TGT NTP reactor into hydrogen ($H_2$) and elemental sulfur.

7 Claims, 10 Drawing Sheets

(56) References Cited

OTHER PUBLICATIONS

Dang et al., "Research on decomposition of hydrogen sulfide using non-thermal plasma with metal oxide catalysis," Energy Procedia, 2012, 16:856-862, 7 pages.
DuPont.com [online], "DuPont Ligasep degasification modules," Mar. 2020, retrieved on Jul. 14, 2022, retrieved from URL <https://www.dupont.com/content/dam/dupont/amer/us/en/water-solutions/public/documents/en/45-D02249-en.pdf>, 4 pages.
He et al., "Dielectric Barrier Discharge for Hydrogen Sulphide Waste Gas Decomposition," IOP Conference Series: Earth and Environmental Science, Feb. 2019, 237:22052, 8 pages.
Jarrige et al., "Decomposition of Gaseous Sulfide Compounds in Air by Pulsed Corona Discharge," Plasma Chemistry and Plasma Processing, May 2007, 27:241-255, 15 pages.
Kolbasi, "Oxygen enrichment at Sulphur recovery unit," Refining Community Presentation, May 2018, 27 pages.
Palma et al., "A review about the recent advances in selected nonthermal plasma assisted solid-gas phase chemical processes," Nanomaterials, Aug. 2020, 10:1596, 56 pages.
Papasidero et al., "Improving operability and process understanding of sulfur recovery unit," Chemical Engineering Transactions, May 2012, 26:237-242, 6 pages.
Paskall et al., "Can oxygen enrichment replace tail gas clean up in sulphur recovery?" Sulphur Recovery, Western Research, 8th edition, 2003, Chapter 8-3, 8 pages.
Paskall et al., "So you don't have a COS/CS2 problem, eh?" Sulphur Recovery, Western Research, 8th edition, 2003, Chapter 2-79, 5 pages.
Reddy et al., "Kinetics of hydrogen sulfide decomposition in a DBD plasma reactor operated at high temperature," Journal of Energy Chemistry, 2013, 22:382-386, 5 pages.
Xuan et al., "Plasma oxidation of H2S over non-stoichiometric LaxMnO3 perovskite catalysts in a dielectric barrier discharge reactor," Catalysts, Aug. 2018, 8:317.
Foster, "Plasma-based water Purification: Challenges and Prospects for the Future," Physics of Plasmas, 2017, 24:055501, 17 pages.
Kelland, "A Review of Kinetic Hydrate Inhibitors from an Environmental Perspective," Energy and Fuels, 2018, 32:12001-12012, 39 pages.
Sanito et al., "Degradation of contaminants in plasma technology: An overview," Journal of Hazardous Materials, 2022, 424:127390, 20 pages.
Sato et al., "Degradation of organic contaminants in water by plasma," International Journal of Plasma Environmental Science and Technology, Mar. 2009, 3(1):8-14, 7 pages.
Singh et al., "Rapid Removal of Poly- and Perfluorinated Compounds from Investigation-Derived Waste (IDF) in a Pilot-Scale Plasma Reactor," Environmental Science & Technology, 2019, 29 pages.
Wang et al., "Performance Evaluation of Hybrid Gas-Liquid Pulse Discharge Plasma-Induced Degradation of Polyvinyl Alcohol-Containing Wastewater," Plasma Chem Plasma Process, 2014, 34:1115-1127, 13 pages.
Zeghioud et al., "Review on Discharge Plasma for Water Treatment: Mechanism, Reactor Geometries, Active Species and Combined Processes," Journal of Water Process Engineering, 2020, 38, 101664, 13 pages.

* cited by examiner

300

400

500

600

700

800

PLASMA TREATMENT IN SULFUR RECOVERY

TECHNICAL FIELD

This disclosure relates to the decomposition of sulfur compounds in sulfur recovery.

BACKGROUND

Hydrogen sulfide can be a byproduct of processing natural gas and refining sulfur-containing crude oils. Other industrial sources of hydrogen sulfide may include pulp and paper manufacturing, chemical production, waste disposal, and so forth. In certain instances, hydrogen sulfide can be considered a precursor to elemental sulfur.

Sulfur recovery may refer to conversion of hydrogen sulfide ($H_2S$) to elemental sulfur, such as in a sulfur recovery unit (SRU), e.g., Claus system. The most prevalent technique of sulfur recovery is the Claus system, which may be labeled as the Claus process, Claus plant, Claus unit, and the like. The Claus system includes a thermal reactor (e.g., a furnace or reaction furnace) and multiple catalytic reactors to convert $H_2S$ into elemental sulfur.

A conventional Claus system can recover between 95% and 98% of sulfur. The percent recovery may depend on the number of Claus catalytic reactors. The tail gas from the Claus system may have the remaining (residual) $H_2S$, such 1% to 5% of the equivalent $H_2S$ in the feed gas. The Claus tail gas can be treated to recover this remaining $H_2S$ equivalent. In particular, a tail gas treatment (TGT) unit, also known as TGTU, can increase sulfur recovery (sulfur recovery efficiency) to or above 99.9%, but generally employs complex and expensive equipment.

This percent recovery efficiency may refer to the percent of $H_2S$ converted and removed from the feed (e.g., acid gas) to the SRU or refer to the percent of sulfur compounds (including $H_2S$) converted and removed from the SRU feed. The basis may be total sulfur compounds in the feed expressed in terms of equivalent 51 (51 meaning sulfur compounds with one sulfur atom in a molecule). Environmental regulations regarding sulfur oxides (SOX) emissions may place requirements (demands) on sulfur recovery efficiency in commercial sulfur recovery.

Hydrogen is commercially produced, such as from fossil fuels. Hydrogen may be produced, for example, through reforming of hydrocarbons or electrolysis of water. Hydrogen is produced by coal gasification, biomass gasification, water electrolysis, or the reforming or partial oxidation of natural gas or other hydrocarbons.

The reforming of natural gas is the most prevalent source of hydrogen production. Bulk hydrogen is typically produced by the steam reforming of natural gas (methane). Conventional steam reforming includes heating the natural gas (e.g., to between 700° C. to 1100° C.) in the presence of steam and a nickel catalyst. This endothermic reaction generates carbon monoxide and hydrogen. The carbon monoxide gas can be subjected to a water-gas shift reaction to obtain additional hydrogen.

The produced hydrogen can be a feedstock to chemical processes, such as ammonia production, aromatization, hydrodesulfurization, and the hydrogenation or hydrocracking of hydrocarbons. The produced hydrogen can be a feedstock to electrochemical processes, such as fuel cells.

SUMMARY

An aspect relates to a method of removing sulfur compounds from gas, including providing a feed gas having sulfur compounds including hydrogen sulfide ($H_2S$) to a furnace of a sulfur recovery unit (SRU), reacting $H_2S$ with sulfur dioxide ($SO_2$) in the furnace and in catalytic converters of the SRU to give elemental sulfur and water ($H_2O$), condensing elemental sulfur vapor in condenser heat exchangers of the SRU and discharging elemental liquid sulfur from the condenser heat exchangers for recovery, and discharging an SRU tail gas having $H_2S$ from the SRU to a hydrogenation reactor of a tail gas treatment (TGT) unit. The method includes converting sulfur compounds in the SRU tail gas in the hydrogenation reactor into $H_2S$, discharging a process gas having $H_2S$ from the hydrogenation reactor to a quench tower of the TGT unit and removing water vapor from the process gas in the quench tower, discharging an overhead gas having $H_2S$ from the quench tower to a non-thermal plasma (NTP) reactor of the TGT unit, and converting $H_2S$ in the NTP reactor into hydrogen ($H_2$) and elemental sulfur.

Another aspect relates to method of removing sulfur compounds from gas, including providing a feed gas having sulfur compounds including $H_2S$ to an SRU having a first NTP reactor having a hydrogen-selective membrane, converting $H_2S$ in the first NTP reactor into $H_2$ and elemental sulfur and recovering the elemental sulfur, recovering $H_2$ through the hydrogen-selective membrane as permeate, and discharging an SRU tail gas from the SRU to a TGT unit having a hydrogenation reactor, a quench tower, and a second NTP reactor. The method includes hydrogenating sulfur compounds in the SRU tail gas in the hydrogenation reactor into $H_2S$, discharging a process gas having $H_2S$ from the hydrogenation reactor to the quench tower and removing water vapor from the process gas in the quench tower, discharging an overhead gas having $H_2S$ from the quench tower to the second NTP reactor, and converting $H_2S$ in the second NTP reactor into $H_2$ and elemental sulfur.

Yet another aspect relates to a sulfur removal system including an SRU to receive air and a feed gas having $H_2S$, the SRU including a furnace to react $H_2S$ with oxygen $O_2$ from the air to give $SO_2$ and water ($H_2O$) and react $H_2S$ with $SO_2$ to give elemental sulfur and $H_2O$, or including an SRU NTP reactor to convert $H_2S$ into $H_2$ and elemental sulfur. The sulfur removal system includes a hydrogenation reactor of a tail gas treatment unit (TGTU) to receive SRU tail gas including $H_2S$ from the SRU and hydrogenate sulfur compounds in the SRU tail gas into $H_2S$. The sulfur removal system includes a quench tower of the TGTU to receive process gas including $H_2S$ from the hydrogenation reactor, remove water vapor from the process gas, and discharge an overhead gas including $H_2S$ to a TGTU NTP reactor of the TGTU, and the TGTU NTP reactor to convert $H_2S$ into $H_2$ and elemental sulfur.

The details of one or more implementations are set forth in the accompanying drawings and the description below. Other features and advantages will be apparent from the description and drawings, and from the claims.

DETAILED DESCRIPTION

Figure 1:
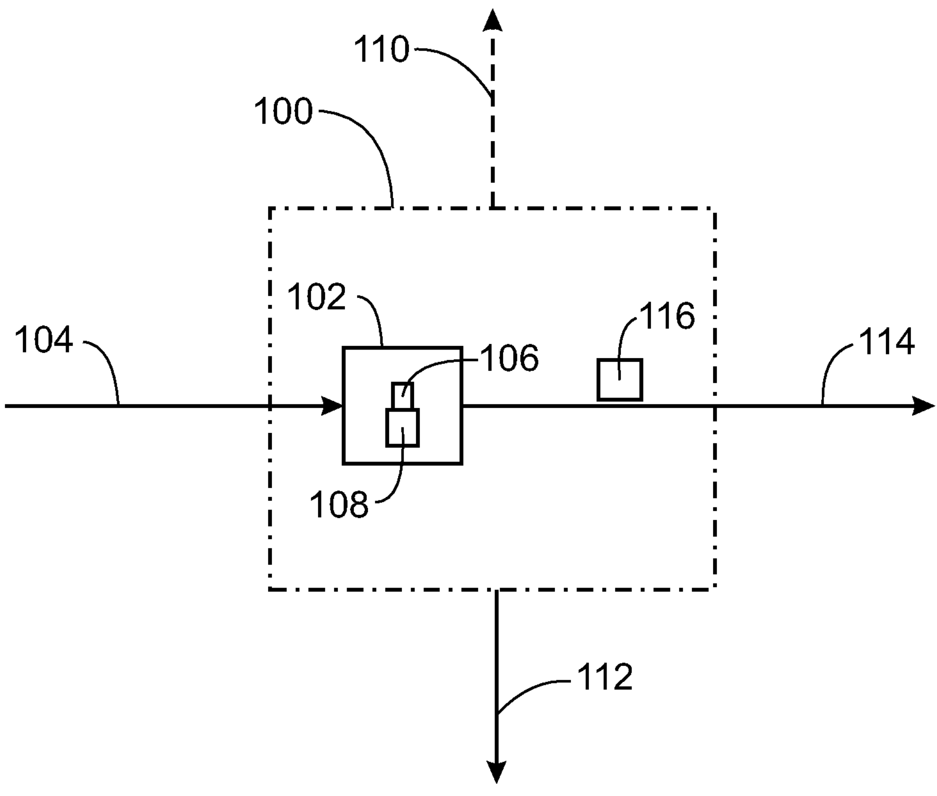
FIG. 1 is a diagram of a non-thermal plasma (NTP) unit having an NTP reactor.

Aspects of the present disclosure relate to the decomposition of sulfur compounds utilizing a plasma reactor, such as a non-thermal plasma (NTP) reactor. For instance, hydrogen sulfide ($H_2S$) may be decomposed in the plasma state into hydrogen ($H_2$) and elemental sulfur (S). The technique may be employed to treat gas having sulfur compounds (e.g., $H_2S$) to remove the sulfur compounds from the gas and recover elemental sulfur.

Certain embodiments are directed to NTP processing of gas having sulfur compounds. The NTP processing may be via an NTP reactor (e.g., of an NTP unit) to dissociate (or decompose) $H_2S$ into hydrogen gas ($H_2$) and elemental sulfur (S). A hydrogen-selective membrane can be included in the NTP reactor (and thus the reactor labeled as an NTP membrane reactor) to capture generated hydrogen gas (e.g., as permeate product).

The NTP reactor or NTP unit (and additional equipment) can be a tail gas treatment (TGT) unit associated with a sulfur recovery unit (SRU). The TGT unit may receive tail gas (having $H_2S$) from the SRU.

The SRU may be a Claus system. See, for example, FIG. 3. An air separation unit (ASU) operationally disposed at the front end of the SRU can remove nitrogen ($N_2$) gas from the air fed to the SRU furnace so the SRU sends less $N_2$ (in the SRU tail gas) to the downstream NTP unit of the TGT unit.

In other embodiments (e.g., FIG. 4), two NTP units can be employed—one as or in the SRU and the other in the TGT unit that receives SRU tail gas. In implementations, acid gas (having $H_2S$) may be fed to the first NTP unit that acts as the SRU. Equipment between the two NTP units can include, for example, a hydrogenation reactor, a cooler heat exchanger, and a quench tower. A sulfur-containing gas (e.g., acid gas) may be fed to the first NTP unit (as main SRU or as a component of the main SRU). A sulfur-containing gas (e.g., SRU tail gas) may be fed from the SRU to the TGT unit having the second NTP unit.

A sulfur-containing gas may be defined herein as a gas having one or more sulfur compounds. The primary sulfur compound in acid gas and SRU tail gas may be $H_2S$. The NTP techniques disclosed herein may be for $H_2S$ abatement and sulfur recovery. A purpose of the plasma reactor may be to convert $H_2S$ by direct dissociation (R1 below) and by reaction with other gases, e.g. $CO_2$ as show by R3 below, to increase the sulfur recovery. The reverse water gas shift reaction of $CO_2$, as shown by R2 below, may also be performed in the plasma reactor.

$$H_2S \rightarrow H_2 + S \quad (R1)$$

$$CO_2 + H_2 \rightarrow CO + H_2O \quad (R2)$$

$$2H_2S\ CO_2 \rightarrow H_2 + 2CO + 2S + H_2O \quad (R3)$$

The present techniques may include a plasma-based decomposition of gas streams having sulfur compounds. The gas stream may be, for example, from petroleum refineries or natural gas processing, and/or an SRU tail gas, and the like. The plasma process (e.g., NTP process) can replace an amine-based TGT. An amine-based TGT can be complicated, expensive, and energy-intensive. The plasma process can also replace (or be incorporated in) and function as the SRU. Compared to conventional SRU and amine-based TGT, the plasma systems as disclosed herein can reduce capital expenditures (CAPEX), such as not requiring a refractory coated reaction furnace or an air blower. Employment of the plasma systems can also reduce operating expenditures (OPEX), such as in not requiring fuel gas, in reducing energy consumption because air blowers and their motors not employed, and on eliminating regeneration and recirculation of amine in the TGT.

A hydrogen-selective membrane may be incorporated into the plasma reactor and therefore the plasma reactor (e.g., NTP reactor) may be labeled as a plasma membrane reactor (e.g., NTP membrane reactor). In implementations, the membrane can be a catalytic membrane in having catalyst incorporated into the membrane. The catalyst may increase conversion rate of desulfurization reaction (e.g., dissociation or decomposition of $H_2S$ into $H_2$ and elemental sulfur (S), and in which the elemental sulfur is later condensed and removed). Simultaneous removal of one of the reaction products (e.g., $H_2$) via the membrane can favor the forward reaction and increase the conversion rate of desulfurization (e.g., $H_2S$ dissociation). Desulfurization may be a technique or chemical process for the removal of sulfur or sulfur compounds from a material.

In the present disclosure, an NTP is combined with a catalyst(s) and thus may be labeled as NTP catalysis. The NTP catalysis at low temperatures (e.g., <250° C.) may dissociate (or decompose) $H_2S$ into $H_2$ and S. The operating pressure may be, for example, near atmospheric, such as less than 2 atmospheres (atm) absolute. A wide range of operating pressures, e.g., from less than 1 bar to more than 10 bar, can be implemented for the NTP catalysis, depending on the type of NTP. The unit "bar" as used herein refers to bar absolute (bara).

Nonthermal plasma (NTP) is a non-equilibrium process, and contains (at low temperatures) radicals and excited states of atoms and molecules that generally only can exist at thermal equilibrium at much higher temperatures (>1000° C.) compared to the low temperature (e.g., <250° C.) of the NTP. Therefore, the chemical processes occurring in the NTP are generally not possible in a non-plasma system at less than 250° C. that is at thermal equilibrium. In NTP, highly energetic electrons interact with gas molecules as electron impact reactions. Such produces radicals, ions, and excited molecules that rotationally, vibrationally, and/or electronically excited molecules that facilitate chemical reactions at mild conditions. The excited molecules are rotationally, vibrationally, and/or electronically excited molecules.

There are different techniques to produced NTP, one of which is dielectric barrier discharge (DBD). DBD is generated when the voltage between two electrodes (at least one of which is covered or blocked by a layer of dielectric material) is higher than the breakdown voltage of the gas passing in between the two electrodes. The voltage difference to generate NTP may depend on the gas composition, pressure, flow rate, temperature, and the distance between the two electrodes. A catalyst(s) can be placed in between the two electrodes, or otherwise situated in the NTP reactor, to increase the gas (e.g., $H_2S$) conversion.

As mentioned, a wide range of operating pressure may be implemented in the NTP depending, for example, on the technique or type of NTP. For instance, atmospheric pressure or near atmospheric pressure (e.g., in range of 0 bar to 1 bar) may be implemented for DBD, corona discharge, pulsed corona discharge, gliding arc discharge, and microwave plasma. However, the operating pressure may be greater than atmospheric for these NTP techniques, such as for example, due to the system hydraulics of the flow of the stream having sulfur compounds (e.g., $H_2S$) through the NTP unit. Moreover, higher operating pressure (e.g., at least 10 bar) may be applied related to the NTP implementation of arc discharge.

The NTP plasma reaction may be maintained above the melting point of sulfur to reduce sulfur deposition inside the plasma reactor. For instance, the NTP reactor temperature (the temperature of the NTP plasma reaction) may be in the range of 150° C. to 250° C.

The operating temperature of the NTP can be, for example, in the range of 20° C. to 900° C. The operating temperature may be in the range of 150° C. to 200° C., 150° C. to 250° C., or 150° C. to 300° C. to reduce or limit sulfur deposition on the catalyst. In implementations, an operating temperature below 150° C. could lead to (cause) significant sulfur deposition. Operating at higher temperatures (e.g., greater than 300° C.) could facilitate formation of unwanted sulfur compounds, e.g., $SO_2$, carbonyl sulfide (COS), etc.

The disclosed NTP technique can be a single or multi-stage with elemental sulfur condensation and removal. The NTP process (apparatus, system) can handle the presence of other gases in the feed, such as water vapor, nitrogen ($N_2$), carbon dioxide ($CO_2$), hydrocarbons, and other contaminants.

FIG. 1 is an NTP unit 100 having an NTP reactor 102 that includes a vessel that receives a feed gas 104 (having sulfur compounds) as feed. The NTP reactor 102 may be, for example, a DBD reactor or other NTP reactor type. The sulfur compounds in the feed gas 104 include $H_2S$. In implementations, the feed gas 104 may be acid gas, or other gas having sulfur compounds. In operation, the NTP reactor 102 places the feed gas 104 in a plasma state that disassociates the $H_2S$ into $H_2$ and elemental sulfur. In implementations, catalyst 106 may be included in the NTP reactor 102 to promote the dissociation of $H_2S$.

The NTP unit 100 may separate and discharge the generated elemental sulfur as liquid elemental sulfur 112. In implementations, NTP unit 100 may discharge the liquid elemental sulfur 112 to a sulfur pit or other destination.

If the NTP reactor 102 has a hydrogen-selective membrane 108, the NTP reactor 102 may separate the generated $H_2$ via the membrane 108 and discharge the hydrogen gas 110 as separated. Thus, the NTP unit 100 may discharge the hydrogen gas 110, e.g., as product.

The removal of the generated $H_2$ may beneficially favor the $H_2S$ dissociation reaction in the NTP reactor 102, in shifting the equilibrium toward the dissociation, and thus increase sulfur recovery. The in-effect simultaneous generation and separation (recovery) of the $H_2$ as a selective removal of the reaction product $H_2$ may shift toward more thermodynamic favoring of the forward reaction to the products side and may prevent or reduce $H_2$ and S recombination to $H_2S$.

In certain implementations, the hydrogen-selective membrane 108 is a tubular (cylindrical) membrane, and the dissociation reaction occurs in a region in the NTP reactor 102 vessel external to the hydrogen-selective tubular membrane in the NTP reactor 102 vessel. The $H_2$ generated in the dissociation reaction may flow as permeate through the tubular membrane wall (the membrane material) into the bore of tubular membrane. The remaining gas (as retentate) in the NTP reactor 102 may remain external to the tubular membrane and discharge from the NTP reactor 102 (e.g., as NTP-treated gas minus the $H_2$ removed). As indicated, removal of the product $H_2$ (a product of the $H_2S$ dissociation) can beneficially favor the $H_2S$ dissociation and thus increase conversion of the $H_2S$ via the $H_2S$ dissociation.

In some implementations with the membrane 108 as a tubular membrane, a sweep gas (e.g., steam, $N_2$, etc.) may be introduced into the bore of the membrane 108 to sweep (displace) the $H_2$ from the bore, thereby beneficially increasing driving force for the separation through membrane wall. The sweep gas may be discharged in the hydrogen gas 110 stream from the NTP unit 100. The steam if utilized as sweep gas may also be utilized (as introduced to the NTP reactor 102) to facilitate temperature control of or within the reactor 102, such as the operating temperature of the reactor 102 including the NTP temperature.

The $H_2$ permeable membrane (e.g., tubular) selective to $H_2$ may include ceramic, metal-coated ceramic composite, high-temperature resistant polymeric material, amorphous silica, carbon-based material, gold, palladium, palladium alloy, etc.

The NTP unit 100 may discharge treated gas 114. The treated gas 114 may be the feed gas 104 as subjected to the plasma treatment in the NTP reactor 102 minus the liquid elemental sulfur 112 (and minus any hydrogen gas 110 removed). The plasma treatment may be placing the feed gas 104 into a plasma state.

The NTP reactor 102, if a DBD reactor, may include a vessel having a high voltage electrode and a low voltage electrode with an intervening dielectric material between the high voltage electrode and the low voltage electrode. In implementations, the catalyst 106 may be disposed between the high voltage electrode and the low voltage electrode. Thus, in operation, the catalyst 106 may be situated in the plasma discharge zone for the gas plasma (NTP formed from gas) that exists between the electrodes in operation.

As mentioned, the NTP reactor 102 may include a hydrogen-selective membrane 108 to separate $H_2$. In implementations, the catalyst 106 (if employed) can be incorporated in the membrane 108 (if employed). In implementations, the hydrogen-selective membrane 108 is disposed to act as the insulating dielectric material between the high voltage electrode and the low voltage electrode.

The $H_2$ selective ceramic/polymeric membrane can act as a dielectric barrier material for the DBD plasma, hence hosting (covering) the high voltage electrode or low voltage electrode (with small gap so $H_2$ can flow) to prevent or reduce electric arcing. The hosting or covering one of the electrodes may be the membrane covering or cylindrically encircling the electrode. See, for example, FIG. 5 in which low voltage electrode is placed inside the tubular $H_2$-selective membrane. See, for example, FIG. 6 in which the $H_2$-selective membranes are positioned with respect to the low voltage electrode.

In operation, the NTP unit 100 (and NTP reactor 102 therein) may receive the feed gas 104 having $H_2S$ and other sulfur compounds. The feed gas 104 may be fed via an inlet conduit (supply conduit) to the NTP unit 100 (and to the NTP reactor 102). The plasma (NTP) in the NTP reactor 102 may be the feed gas 104 in its plasma state (NTP state) flowing in the discharge zone of the NTP reactor 102. The NTP unit 100 may discharge treated gas 114 via an outlet conduit (discharge conduit) that is the feed gas 104 as subjected to the NTP treatment and minus any removed components (e.g., 110, 112).

The NTP unit 100 may be labeled as an NTP system. If catalyst 106 is employed, the NTP unit 100 may be labeled as an NTP catalytic unit, an NTP catalytic system, and so forth. The NTP unit 100 includes the NTP reactor 102 to excite molecules in the feed gas 104 to place the feed gas 104 in a plasma phase (NTP phase) to cause the dissociation reaction of $H_2S$. As indicated, in the plasma state (plasma phase), the $H_2S$ may dissociate into $H_2$ and elemental sulfur. The NTP unit 100 may include multiple NTP reactors 102 in parallel and/or series.

The plasma state (NTP phase) may facilitate the reverse water gas shift reaction $CO_2+H_2 \rightarrow CO+H_2O$, that forms carbon monoxide (CO) and water ($H_2O$). This consumption of $H_2$ generated in the $H_2S$ dissociation may increase $H_2S$ conversion by shifting the $H_2S$ dissociation reaction to product side. The catalyst 106 may promote this reverse water gas shift reaction. In implementations, the catalyst 106 can be bi-functional (or physical mixture of two different catalysts) in promoting both the $H_2S$ dissociation and the reverse water gas shift reaction.

The NTP technique in the NTP reactor 102 may be, for example, DBD, corona discharge, pulsed corona discharge, gliding arc discharge, arc discharge, and so forth. NTP is generated by an electrical discharge. Thus, the word "discharge" may be given in the name of NTP types. The NTP type corona can be referred to as corona discharge or corona plasma.

DBD utilizes two electrodes separated by an intervening dielectric material. Corona discharge employs two electrodes that are asymmetric with respect to each other. Pulsed corona discharge may be similar to corona discharge (generally continuous) but with the high voltage being pulsed. Pulsed corona discharge may be useful to increasing corona power generally without transition to sparks. Gliding arc discharge utilizes two diverging electrodes. Arc discharge is generated between two electrodes with similar of different geometry. The geometry may be, for example tip-to-plan configuration. Arc discharge may be, for example, a low-current arc discharge or high-current thermal arc discharge.

As mentioned, the NTP reactor 102 may include catalyst 106 to facilitate the $H_2S$ dissociation reaction caused by the NTP. The catalyst 106 may be in the NTP reactor 102, as depicted (e.g., for in-plasma catalysis). The catalyst 106 may be selected, designed, or configured to promote the dissociation reaction of $H_2S$ into $H_2$ and elemental sulfur.

The catalyst 106 can be metal-based catalysts (e.g., metal includes iron), metal oxide-based catalyst (e.g., metal oxide includes iron oxide), metal sulfide-based catalyst (e.g., metal sulfide includes molybdenum sulfide), or zeolite-based catalyst (microporous aluminosilicate) (e.g., H-ZSM-5), or any combinations thereof. These catalysts can be supported or unsupported. As an example, supported transition metal sulfide can generally be a good catalyst for the $H_2S$ dissociation (or decomposition) reaction. The metal sulfide may be supported on alumina [aluminum oxide ($Al_2O_3$)]. Specific examples are molybdenum sulfide ($MoS_2$) supported on alumina, cadmium sulfide (CdS) supported on alumina, and zinc sulfide (ZnS) supported on alumina.

The dissociation reaction of $H_2S$ can give elemental sulfur (S) that can be liquid or gas (and condensed by the NTP unit 100 if gas), and removed from the feed gas 104 and from the NTP unit 100 as liquid elemental sulfur 112. At the lower operating temperatures (e.g., less than 250° C.) of the NTP reactor 102, the elemental sulfur may condense or be formed as liquid elemental sulfur 112 in the reactor 102. The reactor 102 may have an outlet to discharge the liquid elemental sulfur 112.

Again, in the NTP reactor 102, the elemental sulfur may be generated as sulfur gas or liquid sulfur in the $H_2S$ decomposition depending, for instance, on the reactor temperature and the concentration of the $H_2S$ and sulfur in the feed gas 104. Thus, the elemental sulfur formed can be in the gas phase or in the liquid phase. The reaction conditions may be adjusted in the NTP reactor 102 to avoid sulfur deposition on the catalyst 106 and on the membrane 108. Sulfur deposition on the catalyst 106 can lead to deactivation of the catalyst 106. Sulfur deposition on the membrane 108 can lead to fouling (plugging) of the membrane 108.

If some or all the elemental sulfur is formed as sulfur gas, the sulfur gas may be condensed into sulfur liquid because of (1) the low temperature (e.g., <250° C.) of the NTP reactor 102, and/or (2) with implementation of a condenser heat exchanger (e.g., shell-and-tube heat exchanger with water as cooling medium) in the NTP unit 100 downstream of the NTP reactor 102 to condense the elemental sulfur gas. In implementations, liquid elemental sulfur may be separated from the treated gas 114 via the condenser heat exchanger and/or via a separation vessel of the NTP unit 100 downstream of the NTP reactor 102. The separator 116 may be the condenser heat exchanger and/or separation vessel.

The NTP unit 100 may have a separator 116 to remove liquid elemental sulfur from the treated gas 114. The separator 116 may be disposed along the discharge conduit from the treated-gas 114 outlet of the NTP reactor 102. The treated gas 114 may flow from the NTP reactor to the separator 116, and then discharge from the separator 116 as the treated gas 114 stream discharged from the NTP unit 100. The separator 116 may collect and remove the liquid elemental sulfur 112 from the treated gas 114 for discharge of the liquid elemental sulfur 112 from the NTP unit 100 as depicted. Again, the separator 116 may include the aforementioned condenser heat exchanger or separation vessel, or both.

The separator 116 can be or include a vessel that is a liquid-gas separator vessel (e.g., a knockout pot or drum) to collect the liquid elemental sulfur 112 from the treated gas 114 and discharge the liquid elemental sulfur 112 from the bottom portion of the vessel. The treated gas 114 may discharge from a side or overhead (top portion) from the separator 116 vessel.

In some implementations, the separator 116 is a heat exchanger (e.g., shell-and-tube heat exchanger) that condenses any elemental sulfur gas in the treated gas 114, discharges the liquid elemental sulfur 112 for collection, and forwards on the treated gas 114 via the discharge conduit. In certain implementations, the cooling medium for the heat exchanger may be cooling water, such as boiler feedwater, demineralized water, steam condensate, treated water, cooling tower water, utility water, or plant water. For this condenser heat exchanger as a shell-and-tube heat exchanger, the condensed elemental sulfur (liquid elemental sulfur 112) may discharge from shell side or the tube side of the exchanger and thus from the NTP unit 100.

In implementations, the separator 116 may be a separation system having both the condenser heat exchanger and the separation vessel downstream of the condenser heat exchanger. In operation, the condenser heat exchanger may receive the treated gas 114 from the NTP reactor 102 and condense sulfur vapor in the treated gas 114 into liquid sulfur 112. The treated gas 114 having the liquid sulfur 112 (including sulfur vapor that was condensed in the condenser heat exchanger) may flow from the condenser heat exchanger to the separation vessel. The liquid sulfur 112 may discharge from a bottom portion of the separation vessel, and thus discharge from the NTP unit 100 for recovery. The treated gas 114 (minus the discharged liquid sulfur 112) may discharge overhead from the separation vessel, and thus discharged from the NTP unit 100.

The inlet conduit to the NTP unit 100 and the outlet conduit on the discharge side of the NTP unit 100 may both be steel. In one implementation, the inlet conduit and the outlet conduit are carbon steel, and with the conduit between the NTP reactor 102 and the separator 116 (e.g., sulfur condenser heat exchanger) being stainless steel.

An SRU may be an important process unit in (or associated with) natural gas processing plants or petroleum refineries, not only for sulfur production but also for abatement of hydrogen sulfide ($H_2S$) gas. As sulfur emissions regulations become more stringent, refineries and gas processors benefit from a cost-effective solution to the sulfur dioxide ($SO_2$) emission problem. The current World Bank standards prescribe that sulfur oxides (SOX) emissions (products of $H_2S$ combustion) should be limited to less than 150 $mg/Nm^3 SO_2$ at stack (dry basis no oxygen). For streams having residual $H_2S$ that are sent to a flare or thermal oxidizer, the $H_2S$ is converted to $SO_2$ in the flare or thermal oxidizer and may be emitted to the environment from the flare stack or thermal oxidizer.

Typical Claus SRUs have a limited sulfur recovery of 95 to 98% (depending on the number of catalytic stages used) due to thermodynamic limitation. Therefore, a tail gas treatment (TGT) process (system) may be implemented after Claus SRU. The most widely used TGT is based on amine absorption, where sulfur-containing gases are converted to $H_2S$ then fed to amine process for selective capture and recycle of $H_2S$ back to Claus furnace. This amine-based TGT process is generally complicated, energy intensive, and expensive due at least to amine regeneration and recirculation, $CO_2$ slippage, and amine losses.

As mentioned, embodiments herein relate to plasma-based techniques to treat gases having sulfur compounds, such as in an SRU or Claus system, and/or in a TGT that receives SRU (e.g., Claus) tail gas. As discussed further below, an application may be a hydrogen sulfur recovery-unit (HSRU) that is a plasma HSRU.

In the conventional Claus system, acid gas (having $H_2S$ as an acid gas) is fed to a furnace (e.g., Claus furnace). An oxidation reaction in the furnace (e.g., reaction furnace or thermal reactor in thermal stage of Claus system) is $2H_2S+3O_2\rightarrow 2SO_2+2H_2O$, which is the oxidation of the entering $H_2S$ from the fed acid gas with fed oxygen ($O_2$) gas (e.g., from fed air) to give $SO_2$ and $H_2O$ vapor. The reaction furnace as a thermal reactor may also perform the Claus reaction $2H_2S+SO_2\rightarrow 3S+2H_2O$, in which $H_2S$ gas and $SO_2$ react to give elemental S gas and $H_2O$ vapor. An overall reaction involving these two reactions (oxidation reaction and Claus reaction) may be characterized as $2H_2S+O_2\rightarrow 2S+2H_2O$ for the Claus thermal stage. In the Claus catalytic stage, the Claus reaction $2H_2S+SO_2\rightarrow 3S+2H_2O$ may also be performed (as a catalytic reaction) in Claus catalytic converters (catalytic reactors) downstream of the furnace.

The Claus system is the most significant (prevalent) gas desulfurizing process, recovering elemental sulfur from gaseous hydrogen sulfide. The multi-step Claus system recovers elemental sulfur from the gaseous hydrogen sulfide found in raw natural gas and from the by-product gases containing hydrogen sulfide derived from refining crude oil and other industrial processes. In brief, the Claus system can be divided into at least two process steps, thermal and catalytic steps. In the thermal step, ambient air (optionally with fuel gas) and acid gas (having $H_2S$) are fed to reaction furnace (Claus furnace) and the $H_2S$ reacts in combustion (e.g., sub-stoichiometric combustion) at temperatures above 850° C. $H_2S$ is converted to elemental sulfur in Claus SRU via the two reactions (R4, R5) below. In implementations, 50% to 70% (or 60% to 70%) of the total amount of elemental sulfur produced in the SRU (Claus system) can be obtained in the thermal step (furnace).

$$2H_2S+3O_2\rightarrow 2SO_2+2H_2O \quad (R4)$$

$$2H_2S+SO_2\rightarrow (3/n)S_n+2H_2O \quad (R5)$$

In the catalytic step, catalyst (e.g., activated aluminum (III) or titanium (IV) oxide) is utilized to boost the sulfur yield. More $H_2S$ reacts with the $SO_2$ formed during combustion in the reaction furnace, and results in gaseous elemental sulfur. Up to 98% of sulfur can be recovered after catalytic steps.

A typical (conventional) Claus unit may have drawbacks. For instance, air may be added to the furnace in one-to-one volume ratio to the sour gas fed to the reaction furnace, which can result unfortunately in a relatively large stream size (large flow rate) through the SRU and TGTU. Furthermore, the Claus plant does not recover the $H_2$ generated in the conversion of $H_2S$ in the Claus reaction but instead oxidizes the $H_2$ to water. Also, $H_2S$ concentration in the feed to the Claus furnace should generally be more than 40 volume percent (vol %), or at least 50 vol %, to maintain the operational flame temperature without co-firing with fuel gas, and thus avoid consumption of fuel gas. In many cases, acid gas enrichment units are utilized prior to Claus units to increase $H_2S$ concentration in Claus feed, which adds additional cost and complexity to the operation.

Embodiments herein can include a plasma-based SRU (or plasma-based sulfur removal system) having two plasma membrane reactors in series with an optional catalytic hydrogenation reactor and water removal between the two plasma membrane reactors. See, for example, FIG. 4. The hydrogenation reactor, water removal (e.g., via a quench tower), and the second plasma membrane reactor can be considered a TGT unit that is downstream of a plasma-based SRU having the first plasma membrane reactor.

The embodiments can address, mitigate, reduce, or eliminate the aforementioned drawbacks of the Claus system. In implementations, certain embodiments (e.g., FIG. 4) generally do not require air and hence potentially give a smaller system size and footprint than a conventional Claus system. The disclosed plasma process (e.g., FIG. 4) can operate with wide range of $H_2S$ concertation in the feed (e.g., from trace amounts [less than 1 vol %] to 90 vol % or more), hence generally do not employ an acid gas enrichment unit. Moreover, the system can recover generated $H_2$. For instance, as the plasma membrane reactor dissociates $H_2S$ into $H_2$ and sulfur (see reaction R1 above), in situ $H_2$ recovery may occur utilizing the hydrogen-selective membrane of the plasma membrane reactor.

Again, the plasma membrane reactor can operate with a wide range of $H_2S$ concentration in the feed from trace amounts (less than 1 vol %) to over 90 vol %. If NTP is employed, the process is generally at relatively low temperature (e.g., <250° C.) thus has less formation of unwanted byproducts, e.g. SON, COS, carbon disulfide ($CS_2$), etc., typically formed at higher temperatures. Finally, the plasma membrane reactor utilizes electrical power. In implementations, electrical power (electricity) can be beneficially obtained from a renewable source, such an energy source relying on wind or solar.

Embodiments herein include plasma tail-gas treatment (PTGT). The disclosed plasma techniques (system, process) for TGT may be labeled at plasma TGT (PTGT) and include a hydrogenation reactor, a cooler heat exchanger, a quenching tower, and a plasma reactor (or plasma membrane reactor). Sulfur compounds (e.g., $SO_2$) in the tail gas are converted (or hydrogenated) to $H_2S$ over a catalyst in the hydrogenation reactor. The process gas (product gas of the hydrogenation reactor) discharged from the hydrogenation reactor is cooled and sent to the quenching tower where water is removed from the process gas. By removing the water, the energy applied in the downstream plasma reactor unit is reduced. The process gas (minus the removed water) is fed from the quench tower to the plasma reactor. The plasma reactor dissociates $H_2S$ in the process gas into $H_2$ and sulfur, as per equation R1 above.

Figure 2:
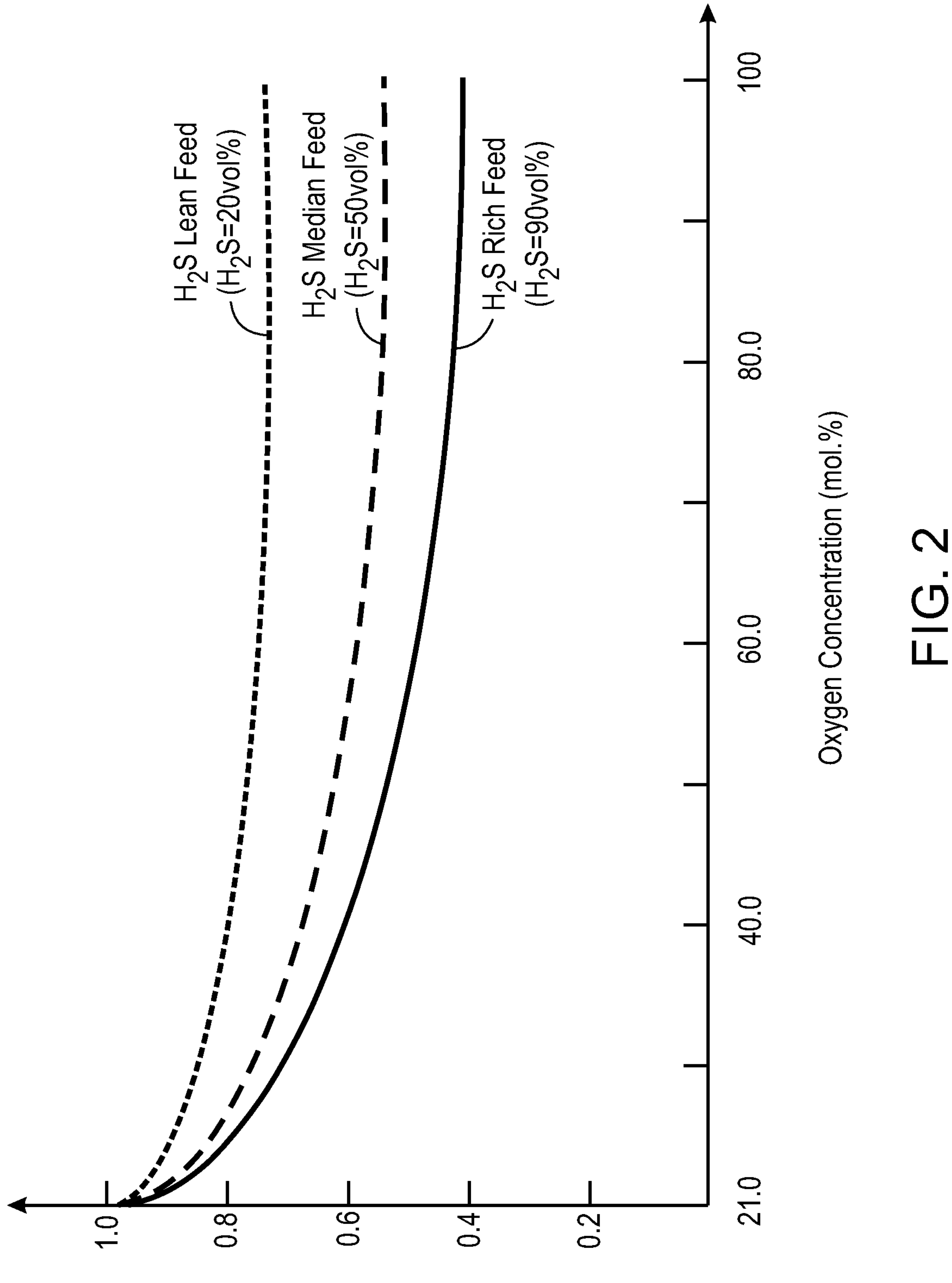
FIG. 2 is a plot of a volume ratio of Claus tail-gas flow rates versus mole percent of oxygen gas in the air fed to the Claus furnace.

To decrease plasma reactor size, increase plasma efficiency in the plasma reactor, and reduce power consumed by the plasma reactor, embodiments of the present techniques reduce nitrogen gas ($N_2$) fed to the plasma reactor. To do so, the $N_2$ content in the SRU (Claus) tail gas may be lowered by feeding substantially pure $O_2$ or an $O_2$ enriched air (instead of unenriched ambient air) to the upstream SRU (Claus) reaction furnace. Oxygen enrichment (for feeding an oxygen-enriched stream instead of air to the SRU furnace) can be achieved by commercially available techniques, such as membrane-based and/or adsorption-based technologies, e.g., temperature swing adsorption (TSA) and pressure swing adsorption (PSA). As an example, a membrane separation unit can be utilized to enrich $O_2$ from ambient level (21 vol %) in ambient air to $O_2$ in the range of 30 vol % to 50 vol % for $O_2$ enriched air fed to the furnace, which may result in at least 20% to 50% reduction in flow of the rate of tail gas, as indicated in FIG. 2. This may depend on feed conditions, such as the concentration of $H_2S$ in the gas stream (e.g., acid gas) having sulfur compounds (e.g., primarily $H_2S$) fed to the furnace, as also indicated in FIG. 2. This reduction in flow rate of tail gas may be solely due to less $N_2$ in the tail gas.

FIG. 2 is a plot of a volume ratio of Claus tail gas flow rates versus mole percent (mol %) of $O_2$ gas in the air fed to the Claus furnace. The ratio of the Claus tail gas flow rates is the Claus tail gas flow rate (with $O_2$-enriched air fed to the upstream furnace) divided by the Claus tail gas flow rate (with normal air fed to the upstream furnace). The plot includes three curves for different concentrations (20 vol %, 50 vol %, 90 vol %) of $H_2S$ in concentration of $H_2S$ in the gas stream (e.g., acid gas) having sulfur compounds (e.g., primarily $H_2S$) fed to the furnace. As can be seen, the tail gas flow rate is reduced with more $O_2$ in the air fed to the furnace (e.g., because less $N_2$ in the tail gas). The tail-gas flow rate is less with greater concentration of $H_2S$ in the sulfur-containing gas stream fed to the furnace (e.g., because more $H_2S$ is converted into elemental sulfur and removed).

Embodiments include techniques for removing sulfur compounds from gas, including providing a feed gas having sulfur compounds including $H_2S$ to an SRU that either has a Claus reaction furnace or an SRU NTP reactor, discharging an SRU tail gas having $H_2S$ from the SRU to a tail gas treatment (TGT) unit having a hydrogenation reactor, a quench tower, and a TGT NTP reactor, converting sulfur compounds in the SRU tail gas in the hydrogenation reactor into $H_2S$, discharging a process gas having $H_2S$ from the hydrogenation reactor to the quench tower and removing water vapor from the process gas in the quench tower, discharging an overhead gas having $H_2S$ from the quench tower to the TGT NTP reactor, and converting $H_2S$ in the TGT NTP reactor into $H_2$ and elemental sulfur.

Figure 3:
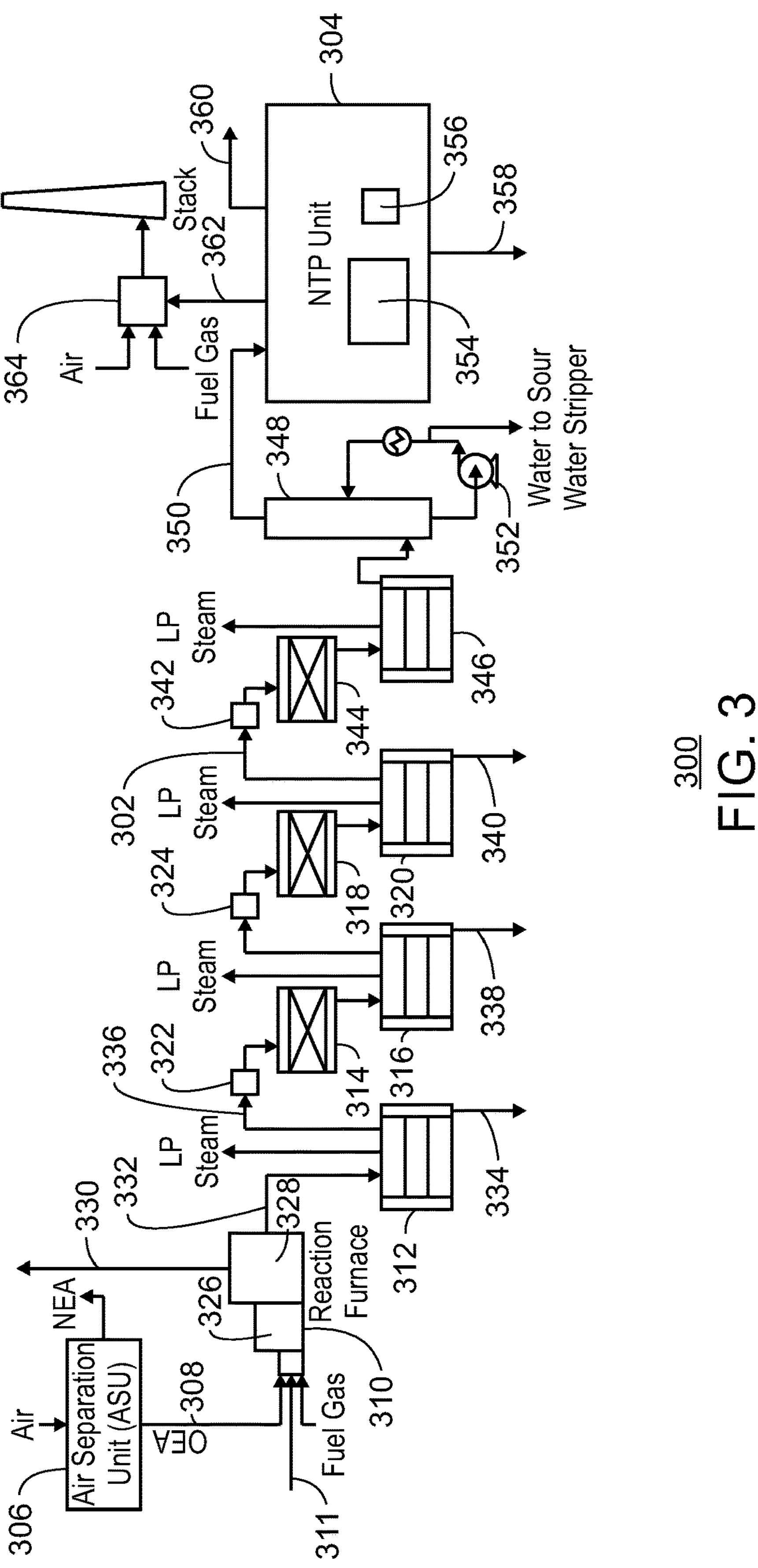
FIGS. 3-4 are diagrams of sulfur removal systems that remove sulfur compounds from a gas.

FIG. 3 is a sulfur removal system 300 that removes sulfur compounds (e.g., $H_2S$) from a gas (e.g., 311). The system 300 includes an SRU (e.g., Claus system or Claus SRU) and a plasma TGT unit that receives tail gas 302 from the SRU. The plasma TGT unit is a unit downstream of the SRU. The plasma TGT unit can be considered as not part of the SRU. On the other hand, the plasma TGT unit can be considered part of the SRU. If so, the sulfur recover system 300 may be considered an SRU, and the Claus system considered as the main SRU. However, for clarity, the sulfur removal system 300 is presented as an SRU (e.g., Claus system) and a plasma TGT unit that receives tail gas 302 from the SRU.

The plasma TGT unit includes an NTP unit 304. The NTP unit 304 may be analogous to the NTP unit 100 of FIG. 1.

The SRU (Claus system) includes an air separation unit (ASU) 306 to feed $O_2$-enriched air 308 to the Claus reaction furnace 310. The feeding of $O_2$-enriched air as compared to feeding normal air to the furnace 310 generally reduces the $N_2$ gas loading on the downstream NTP unit 304. The feeding of $O_2$-enriched air 308 (as compared to feeding normal air) reduces the flow rate of the tail gas 302 because less $N_2$ gas is present in the tail gas 302. The amount (concentration) of oxygen gas ($O_2$) in volume percent (vol %) in the $O_2$-enriched air 308 may be, for example, in the range of 30 vol % to 70 vol %.

A sulfur-containing gas 311 (e.g., having at least $H_2S$ as a sulfur compound) that may be labeled as a feed gas is fed to the Claus reaction furnace 310 for combustion. The sulfur-containing gas 311 may be acid gas having $H_2S$. The acid gas may include $H_2S$ and carbon dioxide ($CO_2$). In implementations, the sulfur-containing gas 311 may be primarily $H_2S$ or primarily acid gas having $H_2S$. The sulfur-containing gas 311 may have $H_2S$, for example, in the range of 5 vol % to 90 vol %. The source of the sulfur-containing gas 311 may be, for example, a byproduct of processing natural gas (from a natural gas processing plant) or refining sulfur-containing crude oils (from a petroleum refinery), and the like.

A fuel gas (e.g., natural gas, methane, etc.) may be fed to the furnace 310 to supplement the firing (combustion) in the furnace. The fuel gas may be fed to facilitate maintaining the operating temperature of the furnace 310 within a specified temperature range or at a specified temperature (temperature set point value).

In the illustrated embodiment, the Claus system (or main Claus system) includes the ASU 306, furnace 310, first condenser 312, first catalytic converter 314, second condenser 316, second catalytic converter 318, and third condenser 320. The condensers 312, 316, 320 may be, for example, shell-and-tube heat exchangers, and utilize water as a cooling medium.

The Claus system includes a thermal stage (or thermal section) and a catalytic section. The thermal stage includes the Claus furnace 310 (which acts a thermal reactor) and the first condenser 312 heat exchanger.

The catalytic section of the Claus system includes the catalytic converters 314, 318 (catalytic reactors) and the condensers 316, 320. Thus, in the illustrated implementation, the catalytic section includes two catalytic stages. The first catalytic stage includes the reheater 322, the first catalytic converter 314, and the second condenser 316. The second catalytic stage includes the reheater 324, the second catalytic converter 318, and the third condenser 320. In other implementations, the Claus system can include 1-2 additional catalytic stages (each having a reheater, catalytic converter, and condenser) giving 3 or 4 catalytic stages in the Claus system.

The catalytic converters 314, 318 may be labeled as Claus catalytic converters in having catalyst characterized as Claus catalyst and in performing the Claus reaction. The Claus catalytic converters 314, 318 (Claus catalytic reactors) may each be a vessel having catalyst (e.g., a bed of catalyst) that can be a Claus (or Claus-type) catalyst. The condensers 312, 316, 320 may each be a shell-and-tube heat exchanger utilizing cooling water as cooling medium.

The Claus reaction furnace 310 is a vessel and has a combustion chamber 326. In operation, the $O_2$-enriched air 308, the sulfur-containing gas 311, and the fuel gas may be fed to an inlet part of the furnace 310 that mixes the $O_2$-enriched air 308, the sulfur-containing gas 311, and the fuel gas in a nozzle to ignite the mixture into the furnace flame for combustion in the combustion chamber 326. The $O_2$-enriched air 308, the sulfur-containing gas 311, and the fuel gas can be fed to the combustion chamber 326.

The oxidation reaction $2H_2S+3O_2 \rightarrow 2SO_2+2H_2O$, shown as R4 above, may occur in the Claus reaction furnace 310. The Claus reaction $2H_2S+SO_2 \rightarrow 3S+2H_2O$, as indicated in R5 above, may occur in the furnace 310. Thus, the furnace gas flowing from the combustion chamber 326 may include $H_2S$, $SO_2$, S, and $H_2O$. The furnace gas may include $CO_2$ from the combustion. The furnace gas may include $N_2$ form the oxygen-enriched air 308.

The Claus furnace 310 includes (or is associated with) a boiler 328 (e.g., waste heat boiler or WHB). The boiler 328 can be labeled as a heat exchanger part of the furnace 310. The boiler 328 may include a shell-and-tube heat exchange in or of the furnace 310 vessel. The boiler 328 typically uses water as a cooling medium to cool the furnace gas and to generate steam from the water. The boiler 328 cools the furnace gas (from the combustion chamber 326) and generates steam with heat from the furnace gas by vaporizing the water cooling medium of the boiler 328. The boiler 328 can be part of the furnace 310 vessel. Again, the boiler 328 can be a shell-and-tube heat exchanger. In implementations, a vessel wall of the furnace 310 may be the shell of the shell-and-tube heat exchanger.

The furnace gas may be cooled in the boiler 328, such as to less than 315° C. Heat from the furnace gas may be utilize to generate steam 330. Steam 330 (e.g., high-pressure steam in the range of 600 pounds per square inch gauge [psig] to 900 psig) may be generated from the water cooling medium (e.g., cooling water such as boiler feedwater, demineralized water, steam condensate, etc.) on the side of the boiler 328 (heat exchanger) opposite the furnace gas. The steam 330 may be discharged from the furnace 310 (e.g., as a co-product).

The furnace exhaust gas 332 (cooled furnace gas, e.g., less than 315° C.) is discharged from the boiler 328 (and thus discharges from the furnace 310) to the first condenser 312. The furnace exhaust gas 332 may include $H_2S$, $SO_2$, S in liquid and vapor form, $H_2O$, and $CO_2$. The furnace exhaust gas 332 may include $N_2$ (greater than trace amounts) if the oxygen-enriched air 308 is not substantially pure $O_2$ and thus has $N_2$. The furnace exhaust gas 332 may be characterized as a process stream in having the $H_2S$ to be converted and elemental sulfur to be recovered.

The first condenser 312 may be a shell-and-tube heat exchanger. The condenser 312 may cool the furnace exhaust gas 332, thereby condensing elemental sulfur vapor in the furnace exhaust gas 332. The cooling medium may be cooling water, such as boiler feedwater, demineralized water, steam condensate, etc. The condenser 312 may discharge the condensed sulfur as liquid elemental sulfur 334, such as to a sulfur receiver.

The sulfur receiver may be labeled as a sulfur pit, which can include a receptacle, container, or vessel, and so on. The sulfur receiver or sulfur pit may be a storage vessel in which liquid sulfur is accumulated and stored. A sulfur pit may temporarily accommodate elemental S extracted from an SRU or similar system and that may be conveyed for further processing or to transportation systems, and the like.

In cooling the furnace exhaust gas 332, the condenser 312 may utilize heat from the furnace exhaust gas 332 to vaporize the cooling water (cooling medium) into steam. The steam may be, for example, low pressure (LP) steam, e.g., less than 150 psig. The steam may discharge from the first condenser 312 for utilization at the facility or plant having the SRU, or by other users.

Process gas 336 may discharge from the first condenser 312 through a reheater 322 to the first catalytic converter 314. The process gas 336 may generally be the furnace exhaust gas 332 not condensed. In other words, the process gas 336 may be the furnace exhaust gas 332 minus the removed elemental sulfur 334. This process gas 336 may be labeled as the gas discharged from the SRU thermal section, and may include $H_2S$, $SO_2$, $H_2O$, $CO_2$, typically $N_2$, and typically entrained residual S. The process gas 336 may be labeled as a process stream in having $H_2S$ and $SO_2$ to be converted into elemental S in the Claus reaction.

The reheater 322 heat exchanger heats the process gas 336. The reheater 322 may facilitate control of catalyst bed temperature in the catalytic converter 314. The reheater 322 (and downstream reheaters 324, 342) may be, for example, an indirect steam reheater (e.g., shell-and tube heat exchanger) in which the process stream (gas) is heated with steam as heating medium. The reheater may be, for example, a fired-reheater (e.g., direct-fired heater) (e.g., a burner) that burns or combusts fuel gas or acid gas to heat the process stream.

The process gas 336 as heated by the reheater 322 enters the first catalytic converter 314. The first catalytic converter 314 (as well as the second catalytic converter 318) may perform the Claus reaction converting $H_2S$ and $SO_2$ in the process gas to elemental S and $H_2O$. The process gas discharges from the first catalytic converter 314 to the second condenser 316 (e.g., shell-and-tube heat exchanger). The condenser 316 condenses elemental sulfur in the process gas into the liquid elemental sulfur 338 discharged from the condenser 316, such as to a sulfur receiver (e.g., sulfur pit). Like the first condenser 312, the cooling medium in the second condenser 316 is cooling water. The first condenser 312 may utilize heat from the process gas to vaporize the cooling water into steam, and discharge the steam, e.g., LP steam less than 150 psig. The process gas minus the removed condensed sulfur (liquid sulfur 338) may be forwarded from the first condenser 312 through the next reheater 324 to the second catalytic converter 318 of the next catalytic stage.

As mentioned, the second catalytic converter 318 may perform the Claus reaction converting $H_2S$ and $SO_2$ in the process gas to elemental S and $H_2O$. The process gas discharges from the second catalytic converter 318 to the third condenser 320 (e.g., shell-and-tube heat exchanger). The condenser 320 condenses elemental sulfur in the process gas into the liquid elemental sulfur 340 discharged from the condenser 320, such as to a sulfur receiver (e.g., sulfur pit). Like the first condenser 312 and the second condenser 316, the cooling medium in the third condenser 320 is cooling water. The third condenser 320 may utilize heat from the process gas in the third condenser 320 to vaporize the cooling medium into steam, and discharge the steam, e.g., LP steam less than 150 psig.

The process gas minus the removed condensed sulfur (liquid sulfur 338) may discharge from the third condenser 320 as SRU tail gas 302 (e.g., Claus tail gas). The Claus system that discharges the tail gas 302 can remove, for example, 95% to 98% of $H_2S$ in the entering gas 311. The tail gas 302 from the Claus system may have the remaining (residual) $H_2S$, such 2% to 5% of the equivalent $H_2S$ in the feed gas. The tail gas 302 may include $H_2S$, $SO_2$, $H_2O$, $CO_2$, $N_2$, S, and other components.

The tail gas 302 may be sent to a TGT unit. In the illustrated implementation, the TGT unit includes a reheater 342, a hydrogenation reactor 344 vessel, a cooler 346 heat exchanger, and the aforementioned NTP unit 304. As mentioned, the TGT unit may be labeled as a plasma TGT unit because of the incorporation of the NTP unit 304. The NTP unit 304 may be analogous to the NTP unit 100 of FIG. 1.

In operation, the tail gas 302 flows through (and is heated in) the reheater 342. The tail gas 302 (as heated in the reheater 342) flows from the reheater 342 to the hydrogenation reactor 344.

The hydrogenation reactor 344 hydrogenates sulfur components (e.g., $SO_2$, COS, $CS_2$, $S_x$, etc.) in the tail gas 302 over catalyst and thus converts those sulfur components into $H_2S$. The source of hydrogen gas for the hydrogenation may be the relatively is small amount (1 vol % to 3 vol %) of $H_2$ present in the tail gas 302 that was generated in the furnace 310. This small amount of $H_2$ may more than enough for hydrogenation. However, if there is a need, utility $H_2$ can be fed to the hydrogenation reactor 344.

The catalyst in the hydrogenation reactor 344 may be hydrogenation catalyst, such as supported molybdenum, molybdenum-cobalt, molybdenum-nickel sulfides, and so forth. The reactor 344 may have the catalyst to promote the hydrogenation reaction(s). The reactor 344 may have a catalyst bed of cobalt-nickel catalyst or cobalt-molybdenum catalyst. In implementations, the reactor 102 may be similar to the hydrogenation reactor in the Shell Claus off-gas treating (SCOT) process/system.

The tail gas 302 as hydrogenated may be labeled as a process gas, e.g., having $H_2S$, $H_2O$, $CO_2$, and $N_2$. The hydrogenated tail gas may be labeled as a process gas in having $H_2S$ to be dissociated into $H_2$ and S in the NTP unit 304. This process gas flows from the hydrogenation reactor 344 through the cooler 346 heat exchanger to the quench tower 348 vessel. The cooler 346 cools (reduces the temperature of) the process gas. The cooling medium in the cooler 346 (e.g., shell-and-tube heat exchanger) may be cooling water, such as boiler feedwater, demineralized water, steam condensate, etc. The cooler 346 may vaporize the cooling water (with heat from the process gas) into steam, e.g., LP steam less than 150 psig discharged from the cooler 346.

The process gas (hydrogenated tail gas) as cooled may flow from the cooler 346 to enter a lower portion of the quench tower 348. The cooled process gas may flow upward through the quench tower 348 in a counter current flow direction with respect to water (liquid water) flowing downward through the quench tower 348. The flowing water may condense water vapor in the process gas flowing upward, and thus remove the water vapor from the process gas. The water may discharge as a bottoms stream from the quench tower 348. The process gas minus the removed water vapor may discharge overhead from the quench tower 348 as overhead gas 350. The overhead gas 350 may have $H_2S$, $CO_2$, and $N_2$.

The quench tower 348 may be a column or vessel having a vertical orientation. Internals in the vessel may include packing or trays to provide for increased contact of the process gas flowing upward with the liquid water flowing downward.

The water discharged as a bottoms stream (from a lower portion of the quench tower 348) may be recirculated, via a pump 352 (e.g., centrifugal pump), to an upper portion of the quench tower 348. The water may be recirculated through a cooler (e.g., shell-and tube heat exchanger) that utilizes a cooling medium (e.g., cooling water, air, etc.) to cool (reduce the temperature of) the recirculated water. The recirculated water may discharge from the cooler, for example, at 60° C. or less, and enter an upper portion of the quench tower 348. A portion of the recirculated water (e.g., upstream of the cooler) may be sent for other processing, such sent to a sour water stripper.

The recirculated water from the cooler may enter the upper portion of the quench tower and flow downward in a counter current direction with the process gas, as mentioned. The water can be labeled as quench water. Again, the water vapor in the gas is condensed in the quench tower 348. This condensed water as excess water is removed from the quench tower 348 in the water discharged from a bottom part of the quench tower 348.

The overhead gas 350 (e.g., having $H_2S$, $CO_2$, and $N_2$) may enter the NTP reactor 354 in the NTP unit 304. As mentioned, the ASU 306 may be combined with (incorporated at the front end of) the upstream SRU to reduce the $N_2$ loading on the NTP unit 304.

The NTP unit 304 and NTP reactor 354 may be analogous to the NTP unit 100 and NTP reactor 102, respectively, of FIG. 1. See also examples of NTP reactors in FIGS. 5 and 6. The NTP unit 304 may include a separator 356 (e.g., heat exchanger and/or separation vessel) that can be analogous to the separator 116 discussed with respect to FIG. 1.

The NTP reactor 354 may place the overhead gas 350 in a plasma state as NTP (e.g., in a plasma discharge zone in the NTP reactor 354), thereby disassociating the $H_2S$ in the received overhead gas 350 into $H_2$ and elemental sulfur vapor, as per reaction R1 above. See FIG. 1 and the associated discussion. The NTP reactor 354 may have a catalyst (e.g., 106 of FIG. 1) to promote the reaction R1.

The NTP unit 304 may condense the elemental sulfur vapor as liquid sulfur 358 discharged from the NTP unit 304. In particular, the NTP reactor 354 (relatively lower operating temperature) and/or separator 356 (e.g., condenser heat exchanger, etc.) may condense the elemental sulfur vapor and discharge the liquid sulfur 358 from the NTP unit 304. The NTP unit 304 may discharge the liquid sulfur 358, for example, to a sulfur pit.

The NTP reactor 354 may include a hydrogen-selective membrane to separate the generated $H_2$ as hydrogen gas 360. In certain implementations, the catalyst that promotes the reaction R1 may be incorporated in the hydrogen-selective membrane. The catalyst may be incorporated in the hydrogen-selective membrane, for example, by mixing the catalyst with other membrane material as mixed matrix membrane or composite structure. For instance, for a composite structure, $H_2$ selective membrane material can be coated on top of a porous catalyst layer.

Further, in implementations for the NTP reactor 354 as or including a DBD reactor, the hydrogen selective membrane (e.g., as a tubular membrane) may be the insulating dielectric material between the high voltage electrode and the low voltage electrode.

The $H_2$ may be separated as permeate through the hydrogen-selective membrane and discharge from the reactor 354 (and the NTP unit 304) as hydrogen gas 360. The remaining gas may be retentate in the NTP reactor 354. The separated hydrogen gas 360 (permeate) may discharge from the NTP reactor 354 (and thus discharge from the NTP unit 304). The $H_2$ gas 360 may be considered product. In some implementations with the membrane as a tubular membrane, a sweep gas (e.g., steam, $N_2$ gas, etc.) may be introduced into the bore of the membrane to sweep (displace) the $H_2$ from the bore and the NTP reactor 354, thereby beneficially increasing driving force for the separation of $H_2$ through membrane wall as permeate into the tubular membrane bore.

The remaining gas (e.g., retentate) (e.g., $CO_2$, $N_2$, any residual $H_2S$, etc.) in the NTP unit 304 may discharge as gas 362 from the NTP unit 304, for example, to a thermal oxidizer 364 (or other incineration or combustion system) for decomposition, incineration, or combustion. The gas 362 may discharge from the NTP reactor 354 and/or separator 356, and thus discharge from the NTP unit 304. The gas 362 may typically discharge from the separator 356 if the separator 356 is employed. In other words, the NTP-treated gas (minus the hydrogen gas 360) may flow from the NTP reactor 354 through the separator 356 to the thermal oxidizer 364.

The NTP reactor 354 having the hydrogen-selective membrane may be labeled as an NTP membrane reactor (NTPMR). Again, the NTP reactor 354 may include the hydrogen-selective membrane to produce the hydrogen gas 360.

In implementations, the NTP reactor 354 does not have a hydrogen-selective membrane. The NTP reactor 354 without the hydrogen-selective membrane may be labeled as an NTP reactor (NTPR). Without a hydrogen-selective membrane, the NTP unit 304 discharges the generated $H_2$ as a component of the gas 362 to the thermal oxidizer 364. There is no separate $H_2$ gas 360 stream. In these implementations, hydrogen gas is generally not collected as product.

The thermal oxidizer 364 may also be labeled as a thermal incinerator. A thermal oxidizer may decompose and combust gas at high temperature. Thermal oxidizers may be a direct-fired thermal oxidizer, regenerative thermal oxidizer (RTO), catalytic oxidizer, and so on. As used herein, the term "thermal oxidizer" may refer to a device or apparatus that thermally decomposes certain gases at a predetermined temperature and releases them into the atmosphere. For example, a gas stream can be introduced to a thermal oxidizer, where any trace quantities of hydrogen sulfide included in the gas stream can be oxidized to sulfur dioxide and subsequently released to the atmosphere.

As discussed with respect to the NTP reactor 102 of FIG. 1, the reverse water gas shift reaction of $CO_2$ may occur in the NTP reactor 354. Moreover, in implementations, steam can be injected into the NTP reactor 354 to heat the reactor 354 for temperature control of the reactor 354. Other heating and temperature control configurations are applicable for the NTP reactor 354 to maintain the NTP reactor 354 at the desired operating temperature. In implementations, the catalytic NTP $H_2S$ dissociation reaction and be a slightly endothermic reaction. Moreover, within the plasma, there is generally some energy losses converted to heat. Thus, there are different ways to optimize and control the heat depending on different parameters.

Figure 4:
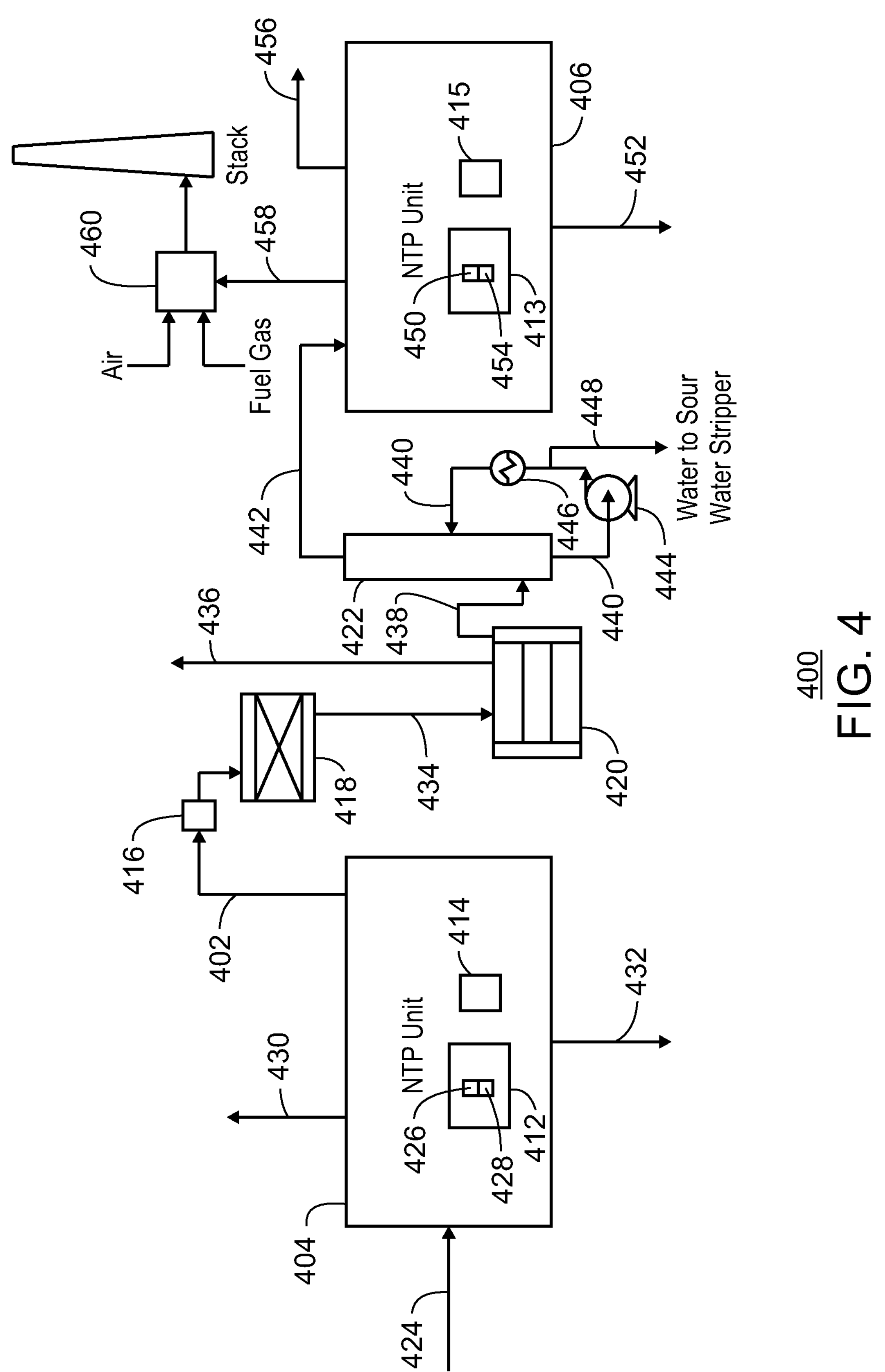

FIG. 4 is a sulfur removal system 400 that removes sulfur compounds (e.g., $H_2S$) from a gas (e.g., 424). The sulfur removal system 400 includes a plasma SRU that receives the gas and a plasma TGT unit that receives tail gas 402 from the plasma SRU. For conventional Claus SRU with 2 or 3 catalytic stages, the sulfur recovery may be 95%-98%. In certain implementations, the sulfur recovery (sulfur recovery efficiency) for a plasma SRU as disclosed herein may be at least 90%. Depending on the number of plasma stages (one plasma reactor per stage) operationally in series, the sulfur recovery for plasma SRU can be in the range of 90% to 99.9%. The value of the sulfur recovery efficiency may increase within this range with increased number of plasma stages employed.

The plasma SRU includes an NTP unit 404 (the first NTP unit). The plasma TGT unit includes an NTP unit 406 (the second NTP unit). The NTP units 404, 406 may each be analogous to the NTP unit 100 of FIG. 1. The first NTP unit 404 may include an NTP reactor 412 and a separator 414 (e.g., heat exchanger and/or separation vessel) analogous to the NTP reactor 102 and separator 116 of FIG. 1. The second NTP unit 406 may include an NTP reactor 413 and a separator 415 (similar to the NTP reactor 412 and separator 414) analogous to the NTP reactors 102, 354 and separators 116, 356 of FIGS. 1 and 3. For examples of NTP reactors, see FIGS. 5 and 6.

In the illustrated implementation, the plasma TGT unit may additionally include a reheater 416 heat exchanger, a hydrogenation reactor 418 vessel, a cooler 420 heat exchanger, and a quench tower 422. The plasma TGT unit may be the same or similar as the plasma TGT unit of the sulfur recovery system 300 of FIG. 3.

In operation, the plasma SRU receives a gas 424 having sulfur compounds including $H_2S$ to the NTP reactor 412 in the first NTP unit 404. The gas 424 may be analogous to the gas 311 of FIG. 3. The gas 424 may be acid gas having $H_2S$ and $CO_2$. The gas 424 may have $H_2S$, for example, in the range of 5 vol % to 90 vol %. The source of the gas 424 may be, for example, a natural gas processing plant or a petroleum refinery. Air, oxygen, or fuel gas streams are generally not fed to the plasma SRU (NTP unit 404), in contrast with a Claus SRU.

The NTP reactor 412 may dissociate the $H_2S$ in the received gas 424 into $H_2$ and elemental sulfur. In particular, the NTP reactor 412 may place the gas 424 into a NTP state in a plasma discharge zone in the NTP reactor 412 for the $H_2S$ dissociation reaction to occur. The NTP reactor 412 may have catalyst 426 (e.g., iron based, iron oxide based, $MoS_2$ based, CdS based, ZnS based, etc.) (e.g., supported on alumina) to promote or assist the dissociation reaction of the $H_2S$ in the $H_2$ and S. The NTP reactor 412 may have a hydrogen-selective membrane 425 to separate and recover the $H_2$ as product. If so, the catalyst 426 (same or similar as catalyst 106 of FIG. 1) to facilitate or assist the plasma dissociation of $H_2S$ may be integrated in the hydrogen-selective membrane 428. The $H_2$ separated via the membrane 428 may be discharged from the NTP reactor 412 (and thus from the NTP unit 404) as hydrogen gas 430, e.g., as product. In some implementations with the membrane 428 as a tubular membrane, a sweep gas (e.g., steam, $N_2$, etc.) may be introduced into the bore of the membrane 428 to sweep (displace) the $H_2$ from the bore and the NTP reactor 412, thereby beneficially increasing driving force for the separation of $H_2$ through membrane 428 wall (membrane 428 material) into the tubular membrane 428 bore.

The elemental sulfur generated in the $H_2S$ dissociation may recovered as liquid sulfur 432. Any elemental sulfur that is vapor may be condensed in the NTP reactor and/or in the separator 414 (e.g., condenser heat exchanger, etc.), as previously discussed, and discharged from the NTP unit 404 as liquid sulfur 432, e.g., to a sulfur pit. The remaining gas in the NTP unit 404 (e.g., not having the hydrogen gas 430 removed 430 nor the sulfur 432 removed) may discharge as plasma SRU tail gas 402 to the plasma TGT unit. The sulfur recovery of the plasma SRU (NTP unit 404) may be, for example, in the range of 90% to 99.9%. The tail gas 402 may have $H_2S$, for example, in the range of 0.02 vol % to 5 vol %. The tail gas 402 may include $H_2S$, $H_2O$, $H_2$, $CO_2$, CO, S (e.g., entrained), and other components. The $CO_2$ may enter in the feed gas 424, e.g., as acid gas. The $H_2O$ and CO may be products of a plasma-induced and/or catalytic-promoted reverse water gas shift reaction of $CO_2$ in the NTP reactor 412. The source of the $H_2O$ can be steam utilized as a heating medium in the NTP reactor 412. The tail gas 402 may be processed in the plasma TGT unit, as discussed with respect to FIG. 3.

The tail gas 402 flows through (and is heated in) the reheater 416. The tail gas 402 (as heated in the reheater 416) flows from the reheater 416 to the hydrogenation reactor 418.

The hydrogenation reactor 418 hydrogenates sulfur components (e.g., $SO_2$, COS, $CS_2$, $S_x$, etc.) in the tail gas 402 over catalyst and thus converts those sulfur components into $H_2S$. The catalyst in the hydrogenation reactor 418 may be hydrogenation catalyst, such as molybdenum, molybdenum-cobalt, molybdenum-nickel sulfides, nickel-cobalt, and so forth.

The hydrogenated gas 434 that discharges from the hydrogenation reactor 418 may include $H_2S$, $CO_2$, CO, and $H_2O$. The gas 434 flows from the hydrogenation reactor 418 through the cooler 420 heat exchanger to the quench tower 422 vessel. The cooler 420 cools (removes heat from) the hydrogenated gas 434. The cooling medium for the cooler 420 (e.g., shell-and-tube heat exchanger) may be cooling water, such as boiler feedwater, demineralized water, steam condensate, etc. The cooler 420 may vaporize the cooling water (with heat from the gas 434) into steam 436, e.g., LP steam less than 150 psig discharged from the cooler 420.

The hydrogenated gas 434 as cooled may discharged as process gas 438 from the cooler 420 to enter a lower portion of the quench tower 422. The cooled hydrogenated gas may be labeled as a process gas 438 in having $H_2S$ to be dissociated into $H_2$ and S in the NTP unit 406. The process gas 438 may flow upward through the quench tower 422 in a counter current flow direction with respect to water 440 (liquid water) flowing downward through the quench tower 422. The water 440 can be considered a quench medium or quench water. The water 440 in the tower 422 may condense water vapor in the process gas 438 flowing upward, and thus remove the water vapor from the process gas 438. The water 440 may discharge as a bottoms stream from the quench tower 422. The process gas 438 minus the removed water vapor may discharge overhead from the quench tower 422 as overhead gas 442. The overhead gas 442 may have $H_2S$, $CO_2$, and CO.

As with the quench tower 348 of FIG. 3, the quench tower 422 may be a column or vessel having a vertical orientation. Internals in the vessel may include packing or trays to provide for increased contact of the process gas 438 flowing upward with the liquid water 440 flowing downward.

The water 440 discharged as a bottoms stream (from a bottom portion of the quench tower 422) may be recirculated, via a pump 444 (e.g., centrifugal pump), to an upper portion of the quench tower 422. The water may be recirculated through a cooler 446 heat exchanger. The 446 cooler may be, for example, a shell-and-tube heat exchanger, fin-type heat exchanger (e.g., with a finned-tube bundle), and so on. The cooler 446 may utilize a cooling medium (e.g., cooling water, air, etc.) to cool (reduce the temperature of) the recirculated water 440. The recirculated water 440 may discharge from the cooler 446, for example, at 60° C. or less, and enter an upper part of the quench tower 422. A portion 448 of the recirculated water 440 (e.g., upstream of the cooler 446) may be sent for other processing, such sent to a sour water stripper.

The recirculated water 440 from the cooler 446 may enter the upper portion of the quench tower 422 and flow downward in a counter current direction with respect to the process gas 438, as mentioned.

The overhead gas 442 (e.g., having $H_2S$, $CO_2$, and CO) may enter the NTP reactor 413 in the NTP unit 406. The NTP reactor 413 may place the overhead gas 442 in a plasma state as NTP (e.g., in a plasma discharge zone in the NTP reactor 413), thereby disassociating the $H_2S$ in the received overhead gas 442 into $H_2$ and elemental sulfur, as per reaction R1 above. The NTP reactor 413 may have a catalyst 450 (e.g., as the catalyst 106 of FIG. 1) to facilitate or promote the reaction R1.

The NTP unit 406 may condense elemental sulfur vapor as liquid sulfur 452 discharged from the NTP unit 406. In particular, the NTP reactor 413 (operating at a relatively low temperature) and/or separator 415 (e.g., condenser heat exchanger, etc.) may condense elemental sulfur vapor and discharge liquid sulfur 452 from the NTP unit 406. The NTP unit 406 may discharge the liquid sulfur 452, for example, to a sulfur pit.

In implementations, the reverse water gas shift reaction of $CO_2$ with the generated $H_2$ (thereby forming CO and $H_2O$) may occur in the NTP reactor 413, e.g., via the gas 442 being in the plasma state and/or as facilitated or promoted by the catalyst 450. The consumption of the $H_2$ in the reverse water gas shift reaction of $CO_2$ may favor the R1 reaction in pushing the equilibrium of the R1 reaction in the NTP reactor 413 toward the product side, and thus more $H_2S$ is beneficially converted. The occurrence of the reverse water gas shift reaction of $CO_2$ in the NTP reactor 413 may be promoted or inhibited by adjusting operating conditions (e.g., pressure, temperature) of the NTP reactor 413, and/or by the selection of the catalyst 450.

The NTP reactor 413 may include a hydrogen-selective membrane 454 to separate the $H_2$ (generated via the R1 reaction) as hydrogen gas 456. This removal of $H_2$ may favor the R1 reaction in pushing the equilibrium of the R1 reaction in the NTP reactor 413 toward the product side, and thus more $H_2S$ is beneficially converted.

In certain implementations, the catalyst 450 may be incorporated in (integrated with) the hydrogen-selective membrane 454.

Further, in implementations for the NTP reactor 413 as or including a DBD reactor, the hydrogen selective membrane 454 (e.g., as a tubular membraned) may be insulating dielectric material between the high voltage electrode and the low voltage electrode.

The separated hydrogen gas 456 may discharge from the NTP reactor 413 (as permeate from the membrane 454), and thus discharge from the NTP unit 406. A sweep gas (e.g., steam, $N_2$, etc. can be employed to sweep (displace) the $H_2$ permeate from the membrane 454 (and thus advancing driving force for the separation of the $H_2$ as permeate. The sweep gas may discharge in the hydrogen gas 456 stream.

The remaining gas 458 (e.g., $CO_2$, CO, $H_2O$ any residual $H_2S$, etc.) in the NTP unit 406 may discharge from the NTP reactor 413 and/or separator 415, and thus discharge from the NTP unit 406. The gas 458 may discharge, for example, to a thermal oxidizer 460 (or other incineration or combustion system) for decomposition, incineration, or combustion, and the like.

Steam may be utilized to heat the NTP reactor 413, in which the steam is injected into the NTP reactor 413. If so, the steam may discharge in the gas 458 stream to the thermal oxidizer 460.

Figure 5:
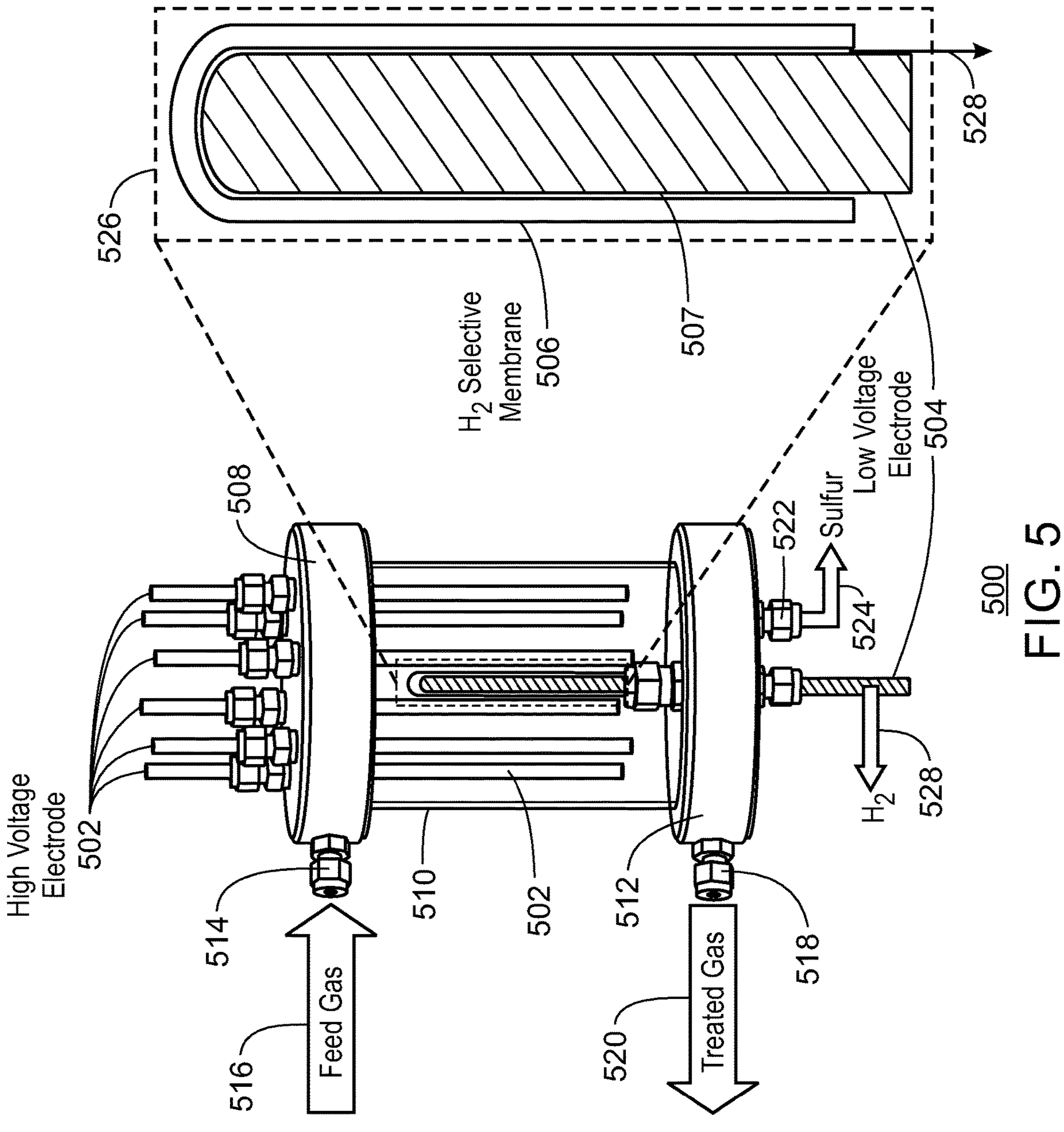
FIGS. 5-6 are diagrams of NTP reactors that are a dielectric barrier discharge (DBD) type reactor.

FIG. 5 is an NTP reactor 500 that is a DBD type reactor. The reactor 500 includes high-voltage electrodes 502 and a low-voltage electrode 504 (grounding). The electrodes 502, 504 may each be a solid cylindrical shape bar (e.g., solid right cylinder) and be metal (e.g., aluminum, copper, alloy, steel, etc.). The low-voltage electrode 504 (grounding electrode) is positioned at the longitudinal axial center of the reactor 500. The six high-voltage electrodes 502 are positioned radially around the low-voltage electrode 504. In the illustrated implementation, a hydrogen-selective membrane 506 (depicted as cross-section) covering the low-voltage electrode 504 is the insulating dielectric material for the reactor 502 as a DBD reactor. In other words, the membrane 506 (e.g., amorphous silica, carbon-based material, temperature-resistant polymeric material, etc.) is the intervening dielectric material between the high voltage electrodes 502 and the low voltage electrode 504. The exploded view 526 shows the hydrogen-selective membrane 506 (depicted as cross-section) covering the low-voltage electrode 504. In this example, the membrane 506 is a tubular membrane having a bore with the low voltage electrode 504 disposed in the bore, and with the top axial end of the membrane 506 as capped.

In implementations, the NTP reactor 500 may have a catalyst to promote $H_2S$ dissociation (and optionally other reactions, such as the reverse water gas shift reaction of $CO_2$). In particular, the catalyst may be disposed in the plasma discharge zone between the low voltage electrode 504 and the high voltage electrodes 502. In certain implementations, the catalyst may be incorporated in the hydrogen-selective membrane 506. As indicated, the catalyst may be metal-based catalyst, metal oxide-based catalyst, metal sulfide-based catalysts, or zeolite-based catalysts, or any combinations thereof. These catalysts can be supported or unsupported. The catalyst inside the reactor 500 may provide for in-plasma catalysis because the catalyst is between the low-voltage electrode 504 and the high-voltage electrode 502. In other words, the catalyst is in the plasma discharge zone where the NTP exists in operation.

The NTP reactor 500 is a vessel having an upper portion 508, a middle portion 510, and a bottom portion 512. The vessel may be generally cylindrical, as depicted, and may have a vertical orientation (as depicted) or a horizontal orientation. The upper portion 508 and bottom portion 512 may be metal, such as steel. The metal may be stainless steel or other metal alloy. The inner (inside) open volume of the vessel may generally be in the middle portion 510. The wall (vessel wall) of the middle portion 510 may be, for example, metal, glass, or plastic (high-temperature polymeric material). While the wall of the middle portion 510 is depicted as translucent in the illustrated implementation, the wall may be not translucent.

The upper portion 508 has six fittings (e.g., tube fitting) to receive and secure the six high-voltage electrodes 502, respectively, through the upper portion 508 into the middle portion 510. In the illustrated embodiment, the lower portion 512 may have a fitting to receive and secure the low voltage electrode 504 into the middle portion 510. An internal fitting may secure the membrane 506.

The upper portion 508 may have a connection 514 to couple to a feed (inlet) conduit (not shown) to receive a feed gas 516 (e.g., having sulfur compound(s) including at least $H_2S$) conveyed via the inlet conduit into the NTP reactor 500. The lower portion 512 may have a connection 518 to couple to a discharge (outlet) conduit (not shown) to discharge treated gas 520 (e.g., as treated in the reactor 500) through the discharge conduit. The lower portion 512 may have a connection 522 to couple to sulfur discharge (outlet) conduit (not shown) to discharge liquid elemental sulfur 524 through the sulfur discharge conduit, such as to a sulfur pit. The connections 514, 518, 522 may be a tubing fitting as depicted, or can be a pipe connection that is flanged, screwed (threaded), or welded.

The operating temperature of the NTP reactor 500 (specifically in the plasma discharge zone) may be, for example, in the range of 150° C. to 300° C. The operating pressure of the NTP reactor 500 may be, for example, less than 2 bar, or in the ranges of 1 bar to 3 bar, or 1 bar to 2 bar.

In operation, the NTP reactor 500 receives the feed gas 516 having $H_2S$. The feed gas 516 may be, for example, acid gas that might be fed to an SRU. The feed gas 516 can be SRU tail gas. The feed gas 516 may flow in a plasma (NTP) state in the plasma (NTP) discharge zone in the NTP reactor 500. For the depicted reactor 500, the plasma (NTP) discharge zone may generally be between the membrane 506 (as the dielectric material) and the high-voltage electrodes 502 (in the middle portion 510). The plasma discharge zone may excite molecules in the gas 516 into a NTP state in the NTP reactor to dissociate $H_2S$ molecules into $H_2$ and elemental sulfur. The aforementioned catalyst may promote the $H_2S$ dissociation reaction.

Elemental sulfur vapor may condense in the reactor 500. As mentioned, liquid elemental sulfur 524 may discharge from the reactor 500. The NTP reactor 500 vessel may have the vertical orientation to facilitate discharge or draining of the liquid sulfur 524 by gravity and pressure.

The $H_2$ generated in the dissociation of $H_2S$ may flow through the hydrogen-selective membrane 506 as permeate into the membrane bore in an annulus 507 (gap) between the membrane 506 material and the low-voltage electrode 504. This annulus 507 is a relatively small gap that exists between the electrode 504 and membrane material of the membrane 506 to collect and discharge the permeated $H_2$.

The $H_2$ gas 528 may discharge from the annulus 507 near or at the lower portion 512 of the reactor 500 vessel into a hydrogen discharge conduit (not shown). In implementations, a vacuum can be pulled on (applied to) the annulus 507 of the bore, for example, via a vacuum pump to promote both [1] diffusion of generated $H_2$ in the middle part 510 through the membrane 506 material into the membrane 506 bore (into the annulus in particular) and [2] discharge of the $H_2$ from the annulus to external of the reactor 500, such as into a $H_2$ discharge conduit. In lieu of (or in addition to) applying a vacuum to the membrane 506 bore, the pressure in the middle part 510 can be maintained above (e.g., slightly above) atmospheric pressure as a driving force for $H_2$ diffusion and discharge. The hydrogen gas 528 may be collected as product in certain implementations.

The treated gas 520 that discharges from the reactor 500 is generally the feed gas 516 as subject to the NTP treatment minus any liquid sulfur 524 removed and minus the hydrogen gas 528 removed. Any entrained liquid sulfur in the treated gas 520 may be removed in a downstream separator. Elemental sulfur vapor in the treated gas 520 may be condensed and removed in a downstream separator. Depending on the application, the treated gas 520 may be, for example, sent as SRU tail gas to a TGT unit, or sent as processed SRU tail gas to a thermal oxidizer.

Figure 6:
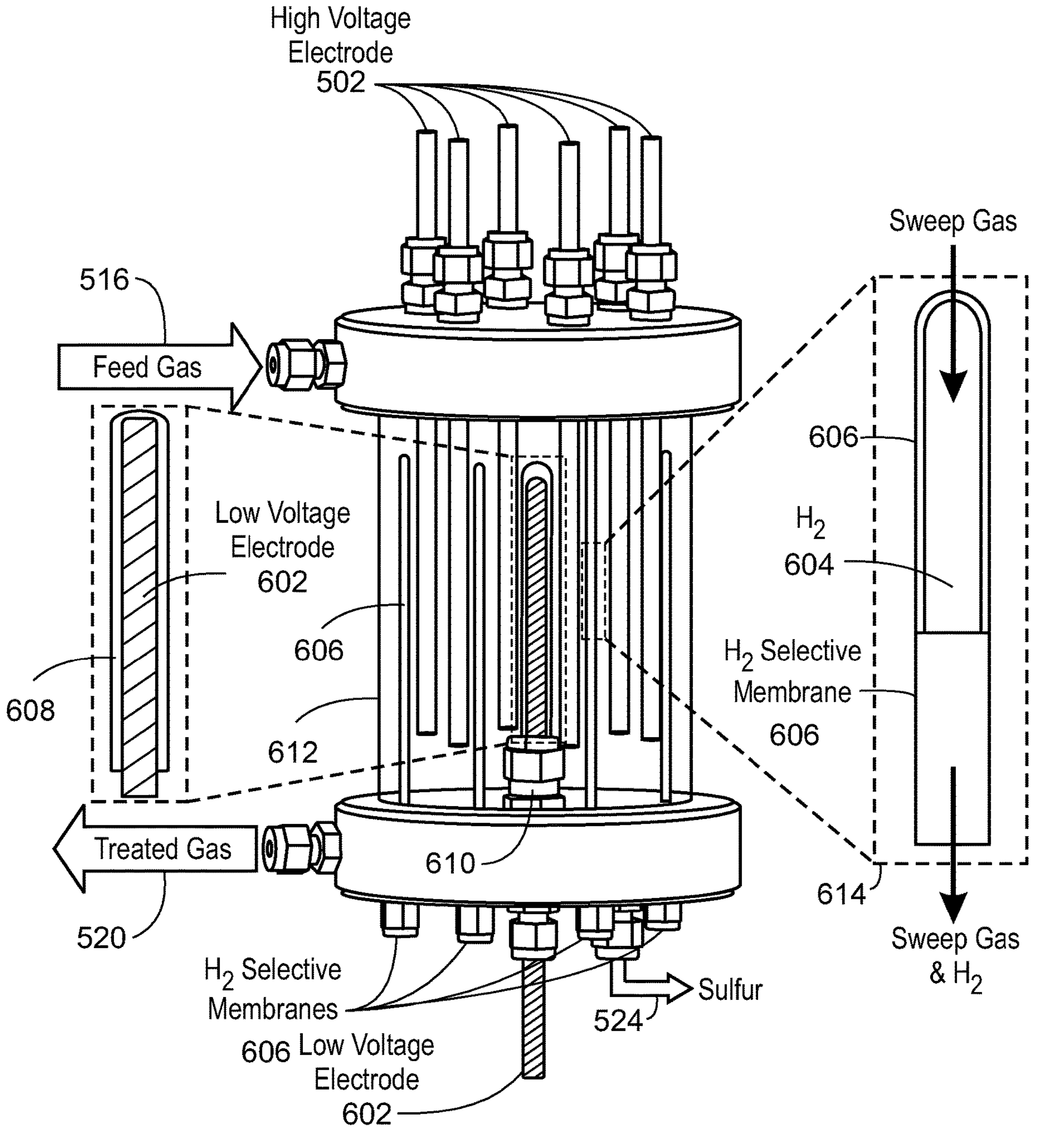

FIG. 6 is a NTP reactor 600 that may be analogous to the NTP reactor 500 of FIG. 5. However, for NTP 600, a hydrogen-selective membrane is not the dielectric material. Instead, a dedicated dielectric material 608 covers the low voltage electrode 602. A fitting 610 may secure the dielectric material 608. The dielectric material 608 may be, for example, ceramic, glass, or non-conductive composite material, and the like. A fitting (e.g., tubing fitting) at the bottom portion of the reactor 600 secures the low voltage electrode 602 at the axial center of the reactor 600, as with the reactor 500 of FIG. 5.

Also as with the NTP reactor 500, the NTP reactor 600 is a vessel having an upper portion, a middle portion 612, and a bottom portion. The vessel may be generally cylindrical, as depicted, and may have a vertical orientation (as depicted) or a horizontal orientation. The upper portion and bottom portion may be metal, such as steel. The metal may be stainless steel or other metal alloy. The inner (inside) open volume of the vessel may generally be in the middle portion 612. The wall (vessel wall) of the middle portion 612 may be, for example, metal, glass, or plastic (high-temperature polymeric material). While the wall of the middle portion 612 is depicted as translucent in the illustrated implementation, the wall may be not translucent.

The reactor 600 has four hydrogen-selective membranes 606 (none of which cover the low-voltage electrode 602). The hydrogen-selective membranes 606 are not the insulating (intervening) dielectric material for the DBD operation. The hydrogen-selective membranes 606 are tubular membranes, each having a bore 604 for receiving $H_2$ through the membrane 606 material as permeate from external to (retentate side of) the tubular membrane. An exploded view 614 of one of the four hydrogen-selective membranes 606 is depicted. For clarity, the upper portion of the membrane 606 in the exploded view is shown as a cross section. The top axial end of the tubular membrane 606 is capped. However, for tubular membranes 606 extending to the upper part of the reactor 600 (as shown for the membrane 606 subject of the exploded view 614) to receive a sweep gas, the top axial end may be open (not capped) to facilitate receipt of the sweep gas into the bore 604.

The reactor 600 may include a catalyst to give or promote dissociation (reaction R1) of $H_2S$ received in the feed gas. In implementations, the catalyst may be situated in the plasma discharge zone (between the low-voltage electrode 602 and the high-voltage electrodes 502) to promote or assist the plasma (NTP)-induced dissociation (R1) of the $H_2S$. In implementations, the catalyst can be incorporated on or in the membrane material of the hydrogen-selective membranes 606.

In operation, the $H_2$ (generated in the catalytic NTP-induced dissociation R1 of $H_2S$) may flow through the hydrogen-selective membrane 606 material as permeate into the respective bore 604 of the four hydrogen-selective membranes 606. In implementations, a sweep gas (e.g., steam, $N_2$ gas, etc.) can be introduced into the bore 604 of one or more of the membranes 606 during operation to displace the $H_2$ permeate from the bore 604. The sweep gas may discharge with the $H_2$ permeate from the bore 604 (and thus from the reactor 600).

Four connections at the bottom portion of the reactor 600 provide for discharge of the $H_2$ permeate from the bore 604 of the hydrogen selective membranes, respectively. In operation, the $H_2$ gas (and any sweep gas) is discharged from the reactor 600 through the four connections into four discharge conduits coupled to the four connections, respectively. The discharged $H_2$ gas may be collected as product.

As discussed, there are different techniques to produced NTP, one of which is DBD. DBD is generated when the voltage between two electrodes (at least one of which is covered or blocked by a layer of dielectric material) is higher than the breakdown voltage of the gas passing in between the two electrodes. The voltage difference to generate NTP may depend on the gas composition, pressure, and the distance between the two electrodes. A catalyst(s) can be placed in between the two electrodes to increase the gas conversion and/or control the product selectivity by providing an alternative reaction pathway with a lower energy barrier.

The NTP type DBD includes a high voltage electrode and low voltage electrode (grounding) with a dielectric barrier there between. In general, DBD is the electrical discharge between two electrodes separated by an insulating dielectric barrier. The DBD unit may employ a power supply giving high voltage alternating current, ranging from lower radio frequency (RF) to microwave frequencies. The discharge zone for the gas plasma (NTP formed from gas) exists between the electrodes. The gas can be acid gas or SRU tail gas, as discussed. In operation, multitudes of random arcs, micro-discharges, or streamers form in the operation gap (discharge zone) between the two electrodes during discharges in the gas (e.g., at atmospheric pressure). In DBD, the random arcs may be more accurately labeled as micro-discharges or streamers instead of arcs because the dielectric material will generally prevent arcing. The contained plasma (NTP) may be sustained with the continuous energy source providing for ionization in overcoming recombination that could lead to extinction of the discharge plasma. The DBD unit can be made in different configurations including planar and cylindrical.

The electrodes (bar, wire, or rod) may be in the inside volume of the NTP reactor. The dielectric material situated between the electrodes gives a DBD configuration. A high-voltage cable (e.g., wire with protective cable coating) may supply the voltage from a power supply to the high-voltage electrode (e.g., a rod electrode). The high voltage may be, for example, in the range of 1 kilovolt (kV) to 50 kV. The numerical range for the high voltage supplied to the DBD unit may depend on the frequency utilized and on the geometry of the reactor, such as the gap between the high voltage(s) and low voltage electrode.

Figure 7:
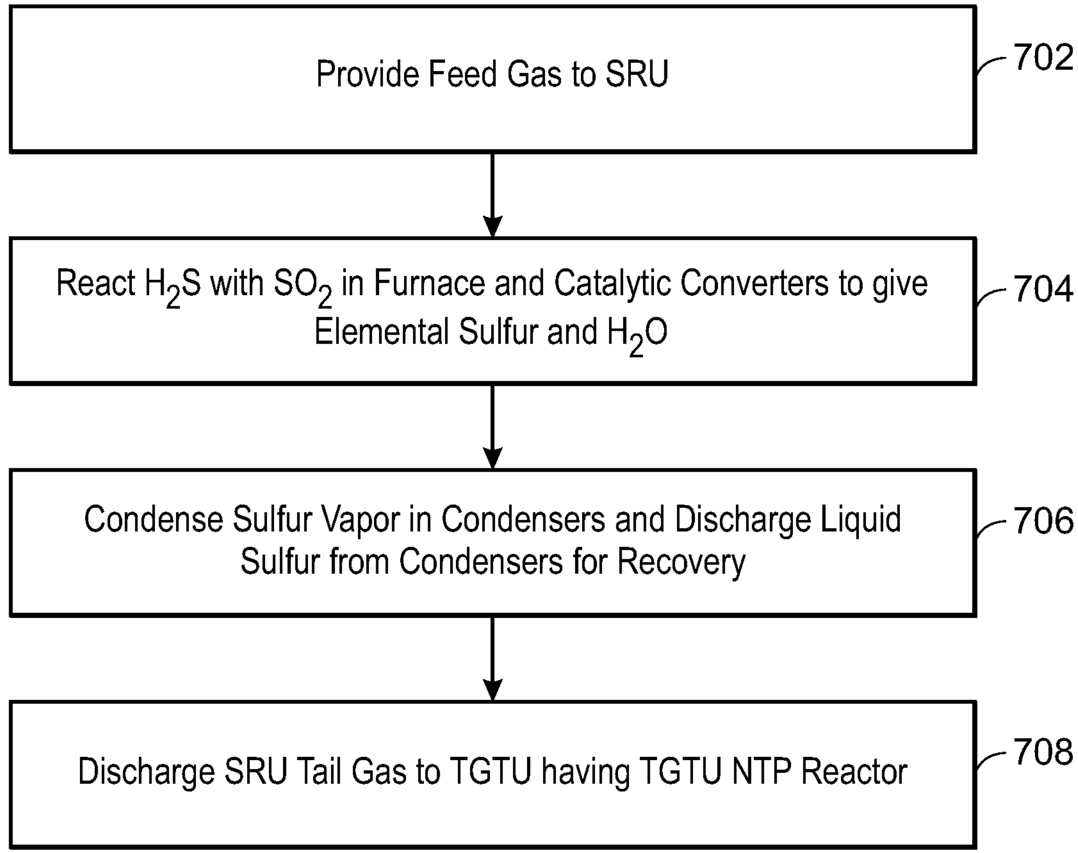
FIGS. 7-10 are block flow diagrams of methods of removing sulfur compounds from gas.

FIG. 7 is a method 700 of removing sulfur compounds from gas. The method employs an SRU (e.g., Claus system). The method 700 may be performed in conjunction with the method 900 of FIG. 9 to give the method of removing sulfur compounds from gas.

At block 702, the method includes providing a feed gas having sulfur compounds including $H_2S$ to a furnace of an SRU. The feed gas may be labeled as sulfur-containing gas in having sulfur compounds. The source of the feed gas may be, for example, a natural gas processing plant or petroleum refinery, and the like. The feed gas may be or include acid gas having $H_2S$ and $CO_2$. The feed gas may be subjected to combustion in the furnace, in which reaction R4 occurs, and the furnace may be a reaction furnace in also performing reaction R5, as in block 704. An overall reaction in the furnace (e.g., Claus furnace as Claus thermal reactor) may be characterized as $2H_2S+O_2 \rightarrow 2S+2H_2O$ in implementations.

At block 704, the method includes performing reaction R5, which is reacting $H_2S$ with $SO_2$, in the furnace (e.g., Claus furnace) and in catalytic converters (catalytic reactors) of the SRU to give elemental sulfur and $H_2O$. The catalytic converters (e.g., each having a bed of Claus catalyst) are disposed operationally downstream of the furnace. See, for example, FIG. 3.

At block 706, the method includes condensing elemental sulfur vapor in condenser heat exchangers of the SRU and discharging elemental liquid sulfur from the condenser heat exchangers for recovery, such as to a sulfur pit. The condenser heat exchangers may each be, for example, a shell-and-tube heat exchanger. Water may be the cooling medium.

One of the condenser heat exchangers may receive furnace gas (furnace exhaust gas or furnace discharge gas) from the furnace and be part of the thermal stage of the SRU as a Claus system. The remaining condenser heat exchangers may receive process gas from the catalytic converters, respectively, and be part of the catalytic section of the SRU as a Claus system.

At block 708, the method includes discharging SRU tail gas (e.g., 302 of FIG. 3) from the SRU to a TGT unit (TGTU) having an NTP reactor. The NTP reactor in the TGTU may be a DBD reactor or other type of NTP reactor. The SRU tail gas includes $H_2S$. The SRU tail gas may have $H_2S$, for example, in the ranges of 0.01 vol % to 10 vol %, or 0.1 vol % to 10 vol %. The method may include discharging the SRU tail gas from the SRU to a hydrogenation reactor of the TGTU. See, e.g., method 900 of FIG. 9 for processing of the SRU tail gas in a TGTU. See also FIG. 3.

Figure 8:
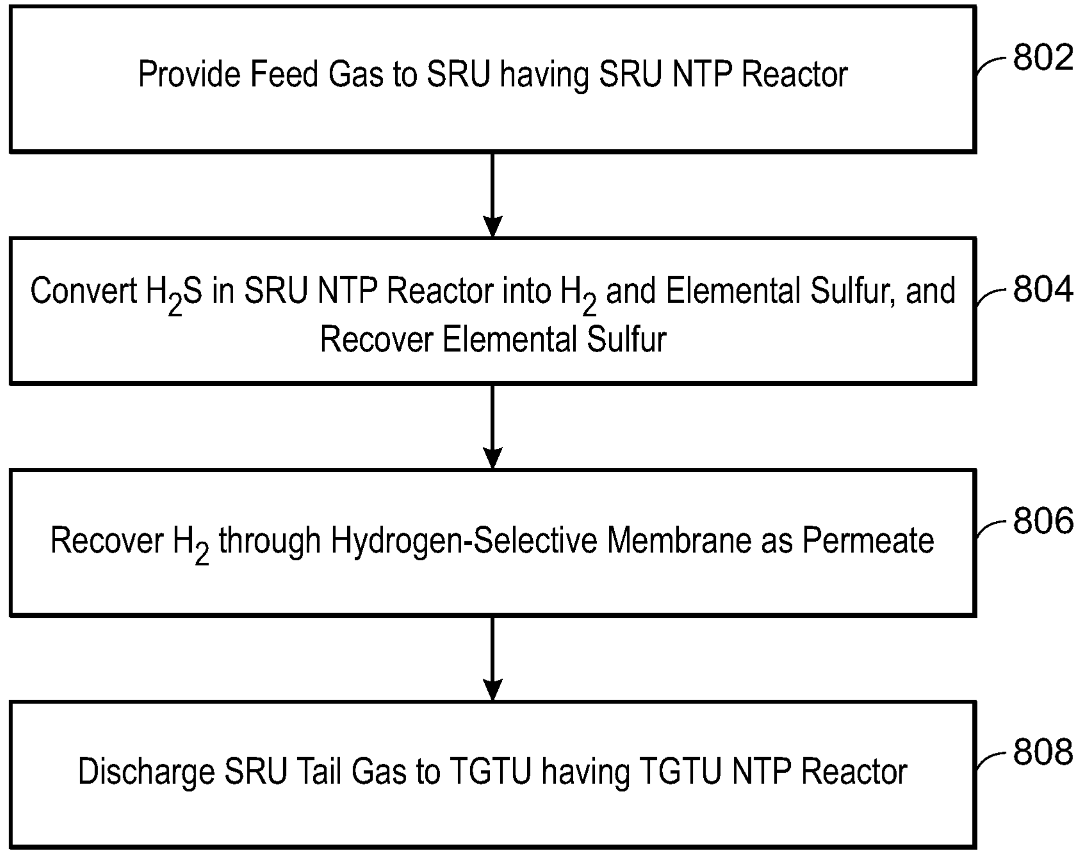

FIG. 8 is a method 800 of removing sulfur compounds from gas. The method employs an SRU that includes an NTP reactor (SRU NTP reactor). See, for example, FIGS. 1 and 4-6. The NTP reactor (e.g., DBD reactor, etc.) is a reactor vessel. The NTP reactor may have high voltage electrode(s) and a low voltage (grounding) electrode.

Figure 9:
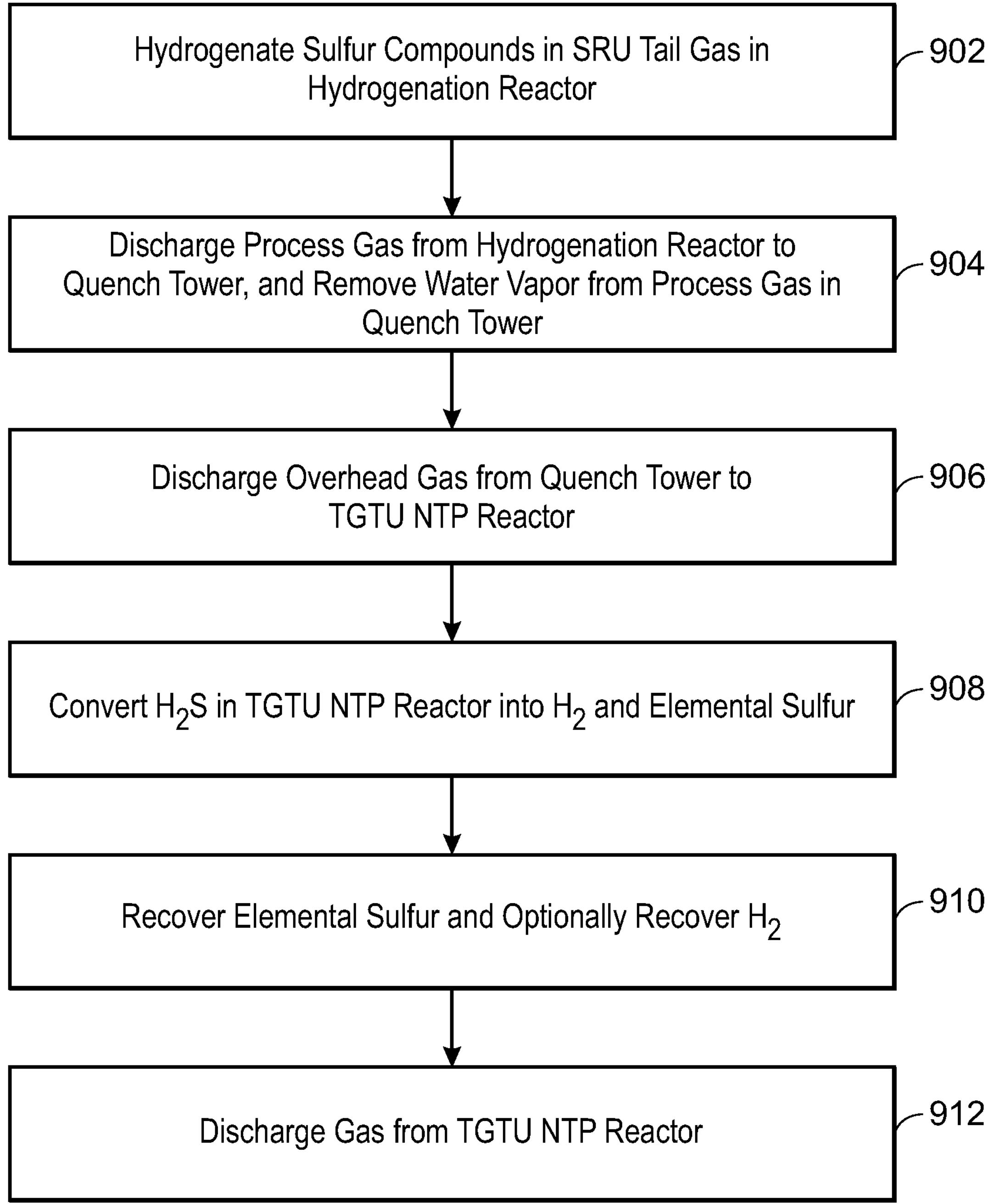

The method 800 may be performed in conjunction with the method 900 of FIG. 9 to give the method of removing sulfur compounds from gas. The method 900 employs a TGTU NTP reactor, which may be labeled as the second NTP reactor, and the SRU NTP reactor of method 800 labeled as the first NTP reactor.

At block 802, the method includes providing a feed gas having sulfur compounds including $H_2S$ to an SRU including an NTP reactor having a hydrogen-selective membrane. The feed gas may be labeled as sulfur-containing gas in having sulfur compounds. The source of the feed gas may be, for example, a natural gas processing plant or petroleum refinery, and the like. The feed gas may be or include acid gas having $H_2S$ and $CO_2$.

At block 804, the method includes [1] converting $H_2S$ in the NTP reactor into $H_2$ and elemental sulfur, such as per reaction R1 ($H_2S$ dissociation reaction), and [2] recovering the elemental sulfur. Again, the NTP reactor (SRU NTP reactor) may be considered the first NTP reactor for method 800 in conjunction with method 900. The elemental sulfur may be recovered as liquid elemental sulfur, such as to a sulfur pit or other destination.

Elemental sulfur vapor may be condensed in the NTP reactor or downstream heat exchanger, or both. The downstream heat exchanger may be a partial condenser in condensing sulfur vapor but not gases such as $CO_2$.

The SRU may be an NTP unit (SRU NTP unit) having the NTP reactor and a downstream separator for recovering elemental sulfur. The separator can be a heat exchanger, separator vessel, or both, for condensing sulfur vapor and removing liquid sulfur, as discussed with respect to FIGS. 1 and 4.

At block 806, the method includes recovering $H_2$ through the hydrogen-selective membrane (of the NTP reactor) as permeate. The $H_2$ permeate may discharge from the NTP reactor (e.g., to be collected as product). In implementations, the hydrogen-selective membrane may be a tubular membrane. The region (for retentate) in the NTP reactor where the R1 reaction occurs may be external to the membrane. The bore of the tubular membrane may be for the $H_2$ permeate. In other words, the $H_2$ generated in the R1 reaction external to the membrane may flow (diffuse) through the hydrogen-selective membrane material to the bore as permeate. In some implementations, a sweep gas (e.g., steam) may be introduced into the bore to facilitate displacement of the $H_2$ permeate from the bore and from the NTP reactor. If so, the sweep gas may discharge with the $H_2$ permeate.

In certain implementations, the hydrogen-selective membrane (e.g., tubular membrane) may act as the insulating dielectric material for the NTP reactor as a DBD reactor. For instance, the tubular membrane may cover the low voltage electrode. See, for example, FIG. 5.

The SRU may discharge an SRU tail gas that is the feed gas as treated in the NTP reactor minus $H_2$ recovered and minus elemental sulfur recovered.

At block 808, the method includes discharging the SRU tail gas from the SRU to a TGTU having a hydrogenation reactor, a quench tower, and a second NTP reactor. See, e.g., method 900 of FIG. 9 for processing of the SRU tail gas in a TGTU. See also FIG. 4. As mentioned, the SRU tail gas may be the feed gas as treated in the SRU NTP reactor (first NTP reactor) minus the $H_2$ generated in the SRU NTP reactor that is recovered and minus the elemental sulfur generated in the SRU NTP reactor that is recovered FIG. 9 is a method 900 of removing sulfur compounds from gas. The method employs a TGTU that includes an NTP reactor (TGTU NTP reactor). See, for example, FIGS. 3-6. The NTP reactor (e.g., DBD reactor, etc.) is a reactor vessel. The NTP reactor may have high voltage electrode(s) and a low voltage (grounding) electrode. The TGTU may include operationally in series a reheater heat exchanger, a hydrogenation reactor, a quench tower, and an NTP reactor. See, e.g., FIGS. 3-4.

The method 900 may be performed in conjunction with the method 800 (involving SRU NTP reactor) of FIG. 8 or method 700 (involving SRU Claus system) of FIG. 7 to give the method of removing sulfur compounds from gas. With respect to method 800, the NTP reactor of method 900 may be labeled as TGTU NTP reactor or second NTP reactor, and the NTP reactor of method 800 labeled as the SRU NTP reactor or first NTP reactor.

As indicated, the method 900 may include receiving SRU tail gas from an SRU that is a Claus system (e.g., FIGS. 3 and 7) or from an SRU that includes an NTP reactor (e.g., FIG. 4 and FIG. 8).

At block 902, the method includes converting (hydrogenating) sulfur compounds in the SRU tail gas in the hydrogenation reactor into $H_2S$. The sulfur may include, for example, $SO_2$, COS, $CS_2$, or elemental sulfur, or any combinations thereof. The hydrogenation reactor may be a reactor vessel having a hydrogenation catalyst to promote the hydrogenation reaction.

At block 904, the method includes discharging a process gas having $H_2S$ from the hydrogenation reactor to the quench tower and removing water vapor from the process gas in the quench tower. The discharging of the process gas may include discharging the process gas (having $H_2S$) from the hydrogenation reactor through a cooler heat exchanger to the quench tower. The process gas discharged from the hydrogenation reactor may be the SRU tail gas as subjected to hydrogenation in the hydrogenation reactor.

The process gas may flow upward through the quench tower in a counter current direction with water (quench water that is cooler than the process gas) flowing downward in the quench tower. The water flowing downward may cool the process gas and thus condense water vapor in the process gas. The condensed water vapor may exit as liquid water with the quench water from the bottom portion of the quench tower.

At block 906, the method includes discharging an overhead gas have $H_2S$ from an upper portion of the quench tower to the NTP reactor (TGTU NTP reactor) (the second NTP reactor with respect to method 800 of FIG. 8). The overhead gas may be the process gas without the water vapor removed in the quench tower. In addition to $H_2S$, the overhead gas may include other gases, such as at least $CO_2$.

At block 908, the method includes converting $H_2S$ in the NTP reactor (TGTU NTP reactor or second NTP reactor with respect to method 800) into $H_2$ and elemental sulfur, such as per reaction R1. The converting of the $H_2S$ may be a dissociation reaction of the $H_2S$ into $H_2$ and elemental sulfur in a plasma discharge zone of the NTP reactor.

At block 910, the method includes recovering elemental sulfur generated by the R1 reaction (dissociation reaction). Liquid elemental sulfur may discharge from the NTP reactor or downstream separator, or both, for recovery, such as to a sulfur pit.

The method can include recovering $H_2$ generated by the R1 reaction. In particular, the method may include recovering $H_2$ generated in the NTP reactor (second NTP reactor with respect to method 800 of FIG. 8) as permeate through a hydrogen-selective membrane of the NTP reactor.

At block 912, the method includes discharging a gas from the NTP reactor, such as to a thermal oxidizer. The gas may be the overhead gas (from the quench tower) as treated in the NTP reactor minus elemental sulfur formed in the NTP reactor that is recovered and minus $H_2$ formed in the NTP reactor that is recovered (if so recovered). The treating of the overhead gas in the NTP be the placing of the overhead gas in a plasma state and performing the R1 reaction. If the NTP reactor does not have the hydrogen-selective membrane, and thus the generated $H_2$ is not recovered, the $H_2$ may discharge with the gas, e.g., to the thermal oxidizer.

An embodiment is a method of removing sulfur compounds from gas, including providing a feed gas having sulfur compounds including $H_2S$ to a furnace of an SRU, reacting $H_2S$ with $SO_2$ in the furnace and in catalytic converters of the SRU to give elemental sulfur and $H_2O$, condensing elemental sulfur vapor in condenser heat exchangers of the SRU, and discharging elemental liquid sulfur from the condenser heat exchangers for recovery. The method includes discharging an SRU tail gas having $H_2S$ from the SRU to a hydrogenation reactor of a TGT unit. The feed gas may include or be acid gas having $H_2S$ and $CO_2$. In implementations, the catalytic converters are disposed operationally downstream of the furnace. The method may include providing 02-enriched air via an ASU to the furnace, wherein $N_2$ loading on an NTP reactor in the TGT unit is less than if normal or ambient air not enriched in $O_2$ is provided to the furnace, and wherein flow rate of the SRU tail gas is less than if normal or ambient air not enriched in $O_2$ is provided to the furnace. The feeding of $O_2$-enriched air may reduce the stream size (flow rate) of the tail gas because less $N_2$ gas is present in the tail gas. Such may facilitate (allow for) the TGT unit to have a smaller NTP reactor (and NTP unit having the reactor), than if normal or ambient air not enriched in $O_2$ is provided (fed) to the SRU furnace.

The method includes converting sulfur compounds in the SRU tail gas in the hydrogenation reactor of the TGT unit into $H_2S$. The sulfur compounds converted into $H_2S$ in the hydrogenation reactor may include $SO_2$, COS, $CS_2$, or elemental sulfur, or any combinations thereof. The method includes discharging a process gas having $H_2S$ from the hydrogenation reactor to a quench tower of the TGT unit and removing water vapor from the process gas in the quench tower. In implementations, the process gas discharged from the hydrogenation reactor includes the SRU tail gas as subjected to hydrogenation in the hydrogenation reactor. The method may include discharging the process gas having $H_2S$ from the hydrogenation reactor through a cooler heat exchanger to the quench tower. The method includes discharging an overhead gas having $H_2S$ from the quench tower to a NTP reactor of the TGT unit, and converting $H_2S$ in the NTP reactor into $H_2$ and elemental sulfur. The overhead gas may include the process gas without the water vapor removed in the quench tower. The converting of the $H_2S$ in the NTP reactor may include or involve a dissociation reaction of the $H_2S$ into $H_2$ and elemental sulfur in a plasma discharge zone of the NTP reactor, and the method includes recovering elemental sulfur generated by the dissociation reaction. The method may include discharging a gas from an NTP unit having the NTP reactor to a thermal oxidizer, wherein the gas includes the process gas as treated in the NTP reactor minus the elemental sulfur that is recovered. The method may include recovering $H_2$ as permeate through a hydrogen-selective membrane of the NTP reactor, and discharging a gas from an NTP unit having the NTP reactor to a thermal oxidizer, wherein the gas includes the process gas as treated in the NTP reactor minus the elemental sulfur that is recovered and minus the $H_2$ that is recovered.

Another embodiment is a method of removing sulfur compounds from gas, including providing a feed gas having sulfur compounds including $H_2S$ to an SRU having a first NTP reactor having a hydrogen-selective membrane, converting $H_2S$ in the first NTP reactor into $H_2$ and elemental sulfur and recovering the elemental sulfur, recovering $H_2$ through the hydrogen-selective membrane as permeate, and discharging an SRU tail gas from the SRU to a TGT unit having a hydrogenation reactor, a quench tower, and a second NTP reactor. The SRU tail gas may include the feed gas as treated in the first NTP reactor minus $H_2$ recovered and minus elemental sulfur recovered. The TGT unit may include operationally in series a reheater heat exchanger, the hydrogenation reactor, the quench tower, and the second NTP reactor. The method includes hydrogenating sulfur compounds in the SRU tail gas in the hydrogenation reactor into $H_2S$, discharging a process gas having $H_2S$ from the hydrogenation reactor to the quench tower and removing water vapor from the process gas in the quench tower, discharging an overhead gas having $H_2S$ from the quench tower to the second NTP reactor, and converting $H_2S$ in the second NTP reactor into $H_2$ and elemental sulfur. The overhead gas may include the process gas without the water vapor removed in the quench tower.

The method may include recovering elemental sulfur formed in converting $H_2S$ in the second NTP reactor, and recovering $H_2$ generated in the second NTP reactor as permeate through a hydrogen-selective membrane of the second NTP reactor. If so, the method may include discharging a gas from the second NTP reactor to a thermal oxidizer, wherein the gas includes the overhead gas as treated in the second NTP reactor minus the elemental sulfur formed in the second NTP reactor that is recovered and minus the $H_2$ formed in the in the second NTP reactor that is recovered. The converting of $H_2S$ in the first NTP reactor and in the second NTP reactor may include a dissociation reaction of the $H_2S$ into $H_2$ and elemental sulfur in a plasma discharge zone of the first NTP reactor and the second NTP reactor, respectively.

Yet another embodiment is a sulfur removal system including an SRU to receive air (e.g., $O_2$-enriched air) and a feed gas having $H_2S$, the SRU including a furnace to react $H_2S$ with oxygen $O_2$ from the air to give $SO_2$ and water ($H_2O$) and react $H_2S$ with $SO_2$ to give elemental sulfur and $H_2O$, or including an SRU NTP reactor to convert $H_2S$ into $H_2$ and elemental sulfur. The feed gas may be or include acid gas having $H_2S$ and $CO_2$.

The sulfur removal system includes a hydrogenation reactor of a tail gas treatment unit (TGTU) to receive SRU tail gas including $H_2S$ from the SRU and hydrogenate sulfur compounds (e.g., $SO_2$, COS, $CS_2$, or elemental sulfur, or any combinations thereof) in the SRU tail gas into $H_2S$. The sulfur removal system includes a quench tower of the TGTU to receive process gas including $H_2S$ from the hydrogenation reactor, remove water vapor from the process gas, and discharge an overhead gas including $H_2S$ to a TGTU NTP reactor of the TGTU, and the TGTU NTP reactor to convert $H_2S$ into $H_2$ and elemental sulfur. The TGTU may include operationally in series a reheater heat exchanger, the hydrogenation reactor, the quench tower, and the TGTU NTP reactor. The process gas as received by the quench tower from the hydrogenation reactor may be or include the SRU tail gas as subjected to hydrogenation in the hydrogenation reactor. The sulfur removal system (TGTU in particular) may include a cooler heat exchanger operationally disposed between the hydrogenation reactor and the quench tower to cool the process gas flowing from the hydrogenation reactor to the quench tower. The overhead gas discharged from the quench tower may be or include the process gas without the water vapor removed in the quench tower.

The sulfur removal system (TGTU in particular) may include a TGTU NTP unit having the TGTU NTP reactor, wherein TGTU NTP unit is configured to recover the elemental sulfur generated in the TGTU NTP reactor, and wherein the TGTU NTP reactor includes a hydrogen-selective membrane to recover $H_2$ through the hydrogen-selective membrane as permeate. The sulfur removal system may include or be associated with a thermal oxidizer to receive a gas discharged from the TGTU NTP unit, the gas including the process gas as treated in the TGTU NTP reactor minus the elemental sulfur that is recovered and minus the $H_2$ that is recovered.

The SRU may include the furnace and catalytic converters downstream of the furnace to react $H_2S$ with $SO_2$ to give elemental sulfur and $H_2O$, and condenser heat exchangers to condense elemental sulfur vapor and discharge liquid elemental sulfur for recovery. If so, the sulfur removal system may include an ASU that removes $N_2$ from the air to provide the air as $O_2$-enriched air to the SRU furnace.

The SRU may include the SRU NTP reactor having a hydrogen-selective membrane to recover as permeate the $H_2$ generated in the SRU NTP reactor, wherein the SRU includes an SRU NTP unit having the SRU NTP reactor to recover elemental sulfur generated in the SRU NTP reactor. If so, the SRU tail gas may include the feed gas as treated in the SRU NTP reactor minus the $H_2$ recovered and minus the elemental sulfur recovered. The converting $H_2S$ in the SRU NTP reactor and in the TGTU NTP reactor may each include or involve a dissociation reaction of the $H_2S$ into $H_2$ and elemental sulfur in a plasma discharge zone of the SRU NTP reactor and the TGTU NTP reactor, respectively.

EXAMPLE

Figure 10:
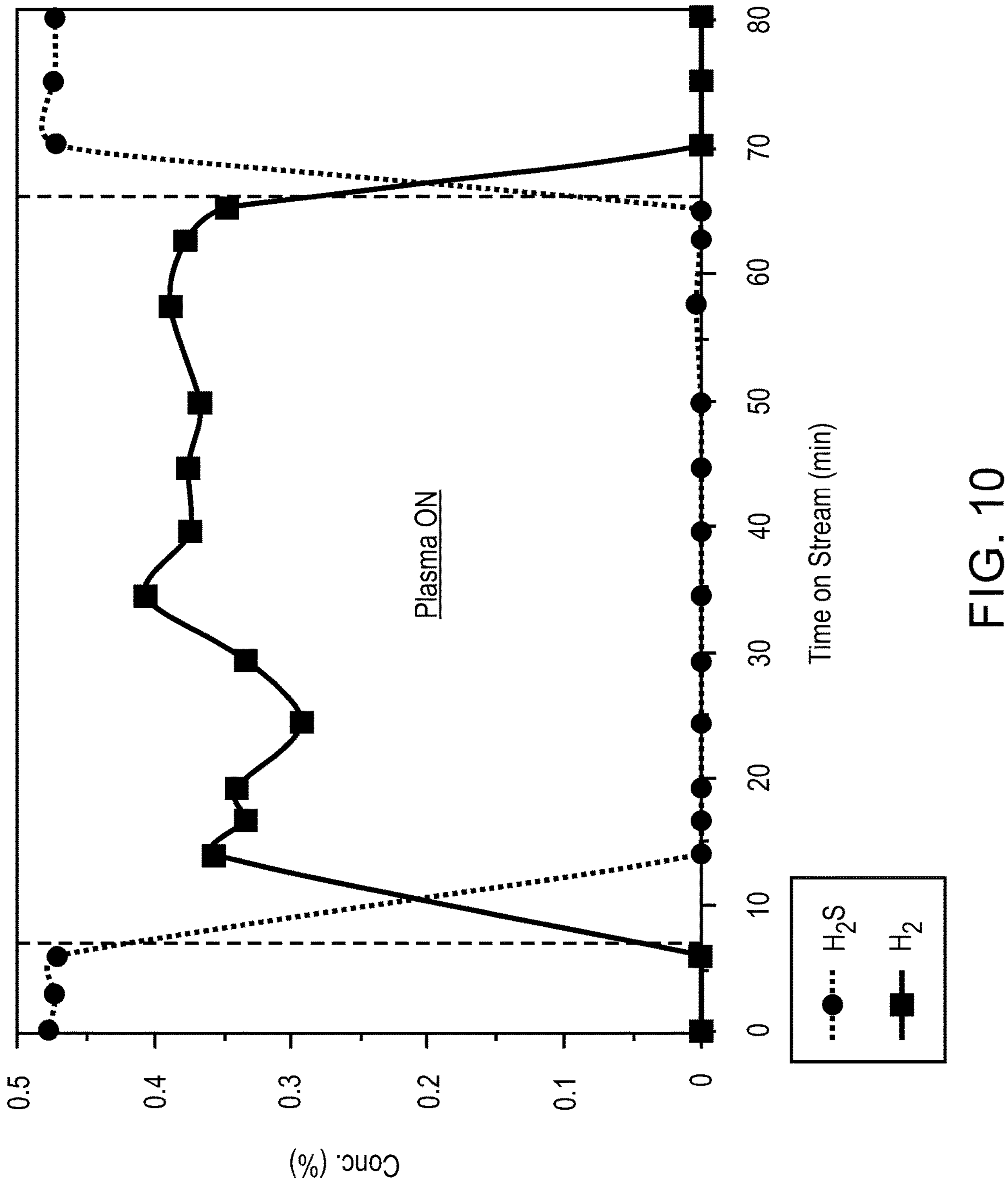

An experiment was conducted in the laboratory to show NTP capability to remove $H_2S$ from a model tail-gas stream. The model tail-gas stream included by volume: 0.47% $H_2S$, 14% $CO_2$, 26% $N_2$, and 1% $H_2O$, balanced with Argon. The model gas was fed at a flow rate of 200 milliliter/minute at ambient conditions to a laboratory NTP DBD reactor having a plasma discharge volume of 1.5 milliliter. Plasma was switched ON by supplying voltage from a power supply to the high-voltage electrode. As shown in FIG. 10, substantially complete removal of $H_2S$ (remaining $H_2S$<10 ppmv) was achieved along with clear $H_2$ production. The residual $H_2S$ ($H_2S$ not removed) was less than 10 parts per million by volume (ppmv). This result demonstrates plasma ability as a tail-gas treatment process.

FIG. 10 is a plot of concentration (vol %) over time (minutes) for the Example performed in the laboratory. Both $H_2S$ and $H_2$ concentrations in the laboratory NTP DBD reactor are plotted. The time includes periods when plasma is switched ON and OFF. Initially, before the plasma is turned on, the $H_2S$ concentration in the NTP DBD reactor is about 0.47 vol % (the $H_2S$ concentration of the model tail gas) and the $H_2$ concentration is zero. After the plasma is turned on (voltage from power source applied to high-voltage electrode), the $H_2S$ concentration in the NTP DBD reactor decreases to less than 10 ppmv and the $H_2$ concentration in the NTP DBD reactor increases to in the range of 0.29 vol % to 0.42 vol %. Then, after the plasma is turned off (voltage from power source applied to high-voltage electrode is stopped), the $H_2S$ concentration in the NTP DBD reactor returns to the $H_2S$ concentration of the supplied model tail gas and the $H_2$ concentration in the NTP DBD reactor drops to zero.

A number of implementations have been described. Nevertheless, it will be understood that various modifications may be made without departing from the spirit and scope of the disclosure.

What is claimed is:

1. A method of removing sulfur compounds from gas, comprising:

providing a feed gas comprising sulfur compounds including hydrogen sulfide ($H_2S$) to a furnace of a sulfur recovery unit (SRU);

reacting $H_2S$ with sulfur dioxide ($SO_2$) in the furnace and in catalytic converters of the SRU to give elemental sulfur and water ($H_2O$);

condensing elemental sulfur vapor in condenser heat exchangers of the SRU and discharging elemental liquid sulfur from the condenser heat exchangers for recovery;

discharging an SRU tail gas comprising $H_2S$ from the SRU to a hydrogenation reactor of a tail gas treatment (TGT) unit;

converting sulfur compounds in the SRU tail gas in the hydrogenation reactor into $H_2S$;

discharging a process gas comprising $H_2S$ from the hydrogenation reactor to a quench tower of the TGT unit and removing water vapor from the process gas in the quench tower;

discharging an overhead gas comprising $H_2S$ from the quench tower to a non-thermal plasma (NTP) reactor of the TGT unit;

converting $H_2S$ in the NTP reactor into hydrogen ($H_2$) and elemental sulfur; and discharging a gas from an NTP unit comprising the NTP reactor to a thermal oxidizer, wherein the gas comprises the process gas as treated in the NTP reactor minus the elemental sulfur that is recovered.

2. The method of claim 1, wherein the feed gas comprises acid gas comprising $H_2S$ and carbon dioxide ($CO_2$), and wherein the catalytic converters are disposed operationally downstream of the furnace.

3. The method of claim 1, wherein the sulfur compounds converted into $H_2S$ in the hydrogenation reactor comprise sulfur dioxide ($SO_2$), carbonyl sulfide (COS), carbon disulfide ($CS_2$), or elemental sulfur, or any combinations thereof, and wherein the process gas discharged from the hydrogenation reactor comprises the SRU tail gas as subjected to hydrogenation in the hydrogenation reactor.

4. The method of claim 1, wherein discharging the process gas comprises discharging the process gas comprising $H_2S$ from the hydrogenation reactor through a cooler heat exchanger to the quench tower, wherein the overhead gas comprises the process gas without the water vapor removed in the quench tower.

5. The method of claim 1, wherein the converting of the $H_2S$ in the NTP reactor comprises a dissociation reaction of the $H_2S$ into $H_2$ and elemental sulfur in a plasma discharge zone of the NTP reactor, and wherein the method comprises recovering elemental sulfur generated by the dissociation reaction.

6. The method of claim 5, comprising:

recovering $H_2$ as permeate through a hydrogen-selective membrane of the NTP reactor; and discharging a gas from an NTP unit comprising the NTP reactor to a thermal oxidizer, wherein the gas comprises the process gas as treated in the NTP reactor minus the elemental sulfur that is recovered and minus the $H_2$ that is recovered.

7. The method of claim 5, comprising providing oxygen ($O_2$)-enriched air via an air separation unit (ASU) to the furnace, wherein $N_2$ loading on the NTP reactor is less than if ambient air not enriched in $O_2$ is provided to the furnace, and wherein flow rate of the SRU tail gas is less than if ambient air not enriched in $O_2$ is provided to the furnace.

* * * * *